(12) United States Patent
Miyakoshi et al.

(10) Patent No.: US 7,489,999 B2
(45) Date of Patent: Feb. 10, 2009

(54) CONTROL APPARATUS AND CONTROL METHOD FOR VARIABLE VALVE APPARATUS

(75) Inventors: Ryo Miyakoshi, Isesaki (JP); Kentaro Mikawa, Isesaki (JP); Masahiro Arai, Yokohama (JP); Hatsuo Nagaishi, Zushi (JP); Yuko Nagaishi, legal representative, Zushi (JP); Takahiro Yoshino, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/962,994

(22) Filed: Dec. 21, 2007

(65) Prior Publication Data
US 2008/0167785 A1 Jul. 10, 2008

(30) Foreign Application Priority Data
Dec. 21, 2006 (JP) ............................. 2006-344818

(51) Int. Cl.
*B60T 7/12* (2006.01)
*F02D 13/04* (2006.01)

(52) U.S. Cl. .................... 701/103; 701/115; 123/90.15; 123/321; 123/674; 123/345

(58) Field of Classification Search ................. 701/102, 701/103, 115; 123/90.11, 90.15, 674, 434, 123/321, 322, 345, 346, 347, 348
See application file for complete search history.

(56) References Cited

U.S. PATENT DOCUMENTS 6,318,349 B1 * 11/2001 Muto et al. ................. 123/674
7,077,085 B2 * 7/2006 Arai et al. ................ 123/90.16
7,092,813 B2 * 8/2006 Abe et al. ................... 701/104
7,222,594 B2 * 5/2007 Hoshino .................. 123/90.15
7,293,537 B2 * 11/2007 Arai et al. ................ 123/90.16
7,308,873 B2 * 12/2007 Arai et al. ................ 123/90.16
7,324,889 B2 * 1/2008 Arai et al. .................... 701/103
2006/0118071 A1 * 6/2006 Harada et al. ............ 123/90.16
2007/0125350 A1 * 6/2007 Morita et al. ............... 123/679
2007/0186885 A1 * 8/2007 Miyakoshi et al. ........ 123/90.16
2008/0167789 A1 * 7/2008 Okamoto et al. ............ 701/105

FOREIGN PATENT DOCUMENTS

JP 2004-340013 A 12/2004

\* cited by examiner

*Primary Examiner*—John T Kwon
(74) *Attorney, Agent, or Firm*—Crowell & Moring LLP

(57) ABSTRACT

In an engine provided with a valve lift amount variable mechanism and a center phase variable mechanism for an intake valve, a region between a region where a flow rate of an intake air passing through the intake valve reaches a sonic speed and a region where an intake air amount does not substantially change relative to a change in an opening area of the intake valve is made to be a learning region. Then, in order to resolve an error in intake air amount in the learning region, a correction value for correcting control process of the valve lift amount variable mechanism is learned. When the learning of the correction value is converged, the learning correction value is corrected with an occupied rate of the valve lift amount variable mechanism in the influence ratio between influences on the two mechanisms in relation to the error. Further, based on the error occurring in a state corrected with the learning correction value which is corrected with the influence ratio, a correction value for correcting control process of the center phase variable mechanism is learned.

21 Claims, 17 Drawing Sheets

CONTROL APPARATUS AND CONTROL METHOD FOR VARIABLE VALVE APPARATUS

BACKGROUND OF THE INVENTION

1. Field of the Invention

The present invention relates to a control apparatus and a control method for a variable valve apparatus including: a center phase variable mechanism which varies a phase of the center of an operating angle of an intake valve; and a valve lift amount variable mechanism which varies a valve lift amount of the intake valve and the operating angle thereof.

2. Description of the Related Art

Japanese Laid-open (Kokai) Patent Application Publication No. 2004-340013 discloses an engine provided with a center phase variable mechanism and a valve lift amount variable mechanism. In the engine disclosed in the above-identified publication, learning of a correction value for correcting a control process of the valve lift amount variable mechanism is conducted so that an error in an amount of intake air is made smaller in a region where a valve operating angle is smaller than a threshold, while learning of a correction value for correcting a control process of the center phase variable mechanism is conducted so that an error in the amount of intake air is again made smaller in a region where the valve operating angle is larger than the threshold.

Incidentally, it is understood that, in case where a flow rate of intake air passing through an intake valve of an engine reaches a sonic speed, learning of a correction value for correcting the control process of a valve lift amount variable mechanism can be surely achieved.

However, there often occurs a case such that the sonic speed in the flow rate of the intake air during passing through the intake valve cannot be accomplished unless the valve lift amount is lessened more than the valve lift amount necessary for an idle operation of the engine i.e., during idling of the engine.

Accordingly, such a difficulty must be encountered in which acquisition of a lot of chance for learning the correction value for correcting the control process of the valve lift amount variable mechanism with certainty cannot be ensured.

SUMMARY OF THE INVENTION

In view of the above problem, an object of the present invention is to provide a control apparatus and a control method by which it is able to surely learn, at a high frequency, a correction value for correcting control process of a valve lift amount variable mechanism and a correction value for correcting control process of a center phase variable mechanism.

In order to achieve the above object, according to the present invention, when an engine is operated within an intermediate region of operation, i.e., an intermediate operating region, that extends between a first operating region where an intake air amount changes in proportion to an opening area of an intake valve and a second operating region where the intake air amount does not substantially change relative to a change in the opening area of the intake valve, an error in the intake air amount is computed, and a ratio between an influence on a center phase variable mechanism and that on a valve lift amount variable mechanism relative to the computed error in the intake air amount is further computed. Then, correction values for respectively correcting the center phase variable mechanism and the valve lift amount variable mechanism are learned based on the error in the intake air amount at that time and the computed influence ratio.

The other objects and features of this invention will become more understood from the following description with reference to the accompanying drawings.

DESCRIPTION OF PREFERRED EMBODIMENTS

Figure 1:
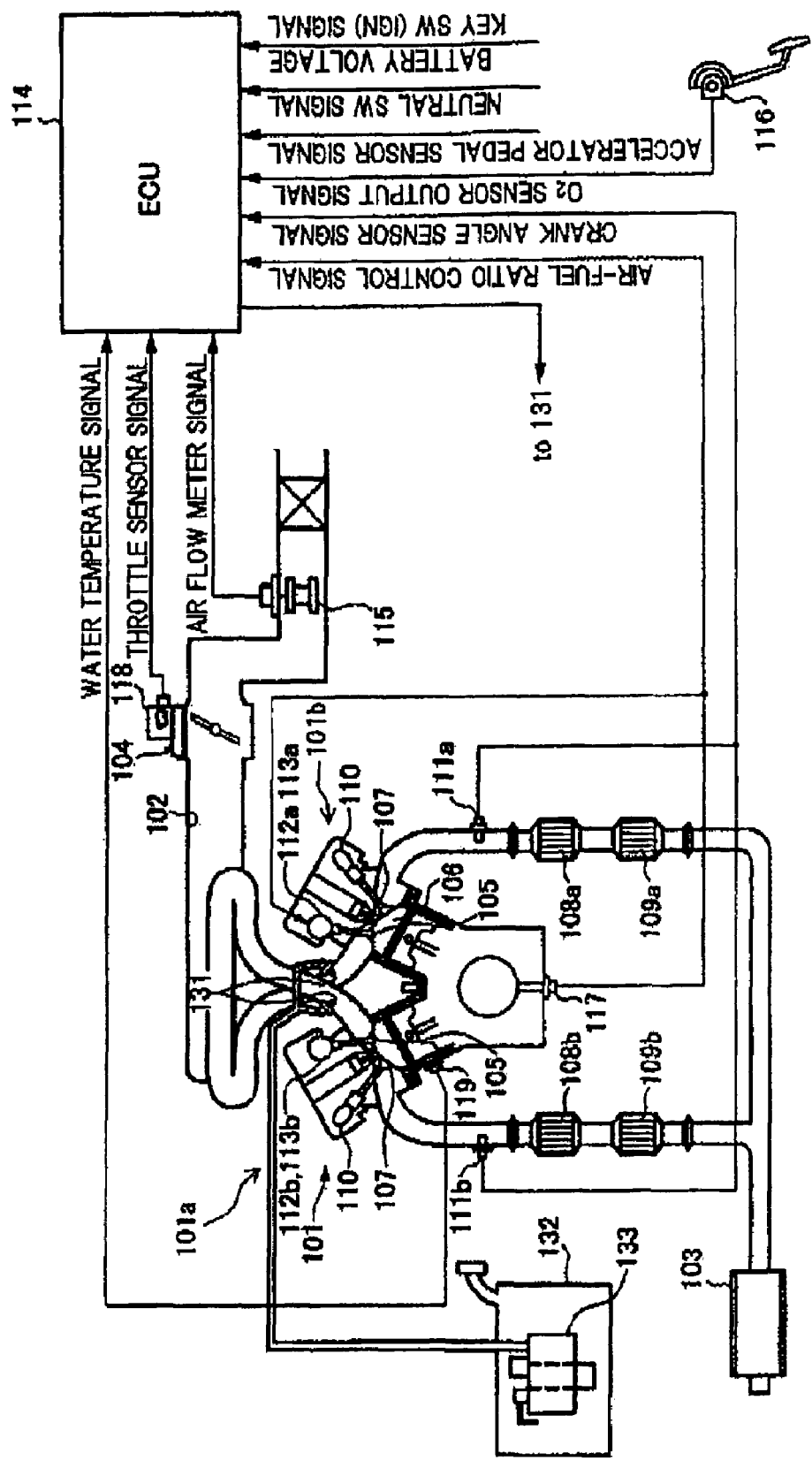
FIG. 1 is a systematic diagram of an engine according to an embodiment of the present invention.

FIG. 1 is a systematic diagram showing an engine for vehicle according to the embodiment of the present invention.

In FIG. 1, an engine 101 is a V-type engine comprises left and right banks 101a and 101b.

In an intake pipe 102 of engine 101, there is disposed an electronically controlled throttle 104.

Air passed through electronically controlled throttle 104 is distributed to respective banks 101a and 101b, and thereafter, is further distributed to each cylinder.

In each cylinder, the air is introduced, by suction, into a combustion chamber 106 via an intake valve 105.

The exhaust gas in each cylinder is discharged from combustion chamber 106 via an exhaust valve 107 and thereafter, is collected for each bank, to be purified by each front catalytic converter 108a, 108b and each rear catalytic converter 109a, 109b, which are disposed in each bank 101a, 101b.

The exhaust gas in each bank after purified by each rear catalytic converter 109a, 109b is combined to flow into a muffler 103, and thereafter is discharged into the atmosphere.

Exhaust valve 107 is driven to open or close by a cam axially supported by an exhaust camshaft 110, while maintaining a fixed valve lift amount, a fixed valve operating angle and fixed valve timing thereof.

On the other hand, a valve lift amount of intake valve 105 as well as an operating angle thereof is continuously varied by each valve lift amount variable mechanism 112a, 112b.

Further, a phase of the center of the operating angle of intake valve 105 is continuously varied by each center phase variable mechanism 113a, 113b.

An electronic control unit (ECU) 114 incorporating therein a microcomputer controls electronically controlled throttle 104, each valve lift amount variable mechanism 112a or 112b, and each center phase variable mechanism 113a or 113b, in order to obtain a target intake air amount corresponding to an accelerator pedal position.

Electronic control unit 114 receives signals from various sensors.

As the various sensors, there are disposed: an air flow sensor 116 for detecting an intake air flow amount of engine 101; an accelerator pedal position sensor 116 for detecting an accelerator pedal position; a crank angle sensor 117 for detecting a rotating angle of a crankshaft; a throttle sensor 118 for detecting an opening TVO of electronically controlled throttle 104; a water temperature sensor 119 for detecting the cooling water temperature of engine 101; air-fuel ratio sensors 111a and 111b for detecting air-fuel ratios in the respective banks; and the like.

Further, on an intake port on the upstream side of intake valve 105, a fuel injection valve 131 is disposed for each cylinder.

To fuel injection valve 131, fuel in a fuel tank 132 is sent under pressure by a fuel pump 133. Then, when fuel injection valve 131 is driven to open based on an injection pulse signal from electronic control unit 114, the fuel of amount proportional to injection pulse width is injected into engine 101.

Next, there will be described based on FIG. 2 through FIG. 4, structures of each valve lift amount variable mechanism 112a, 112b and those of each center phase variable mechanism 113a, 113b.

In engine 101 in the present embodiment, a pair of intake valves 105, 105 is disposed for each cylinder, and above intake valves 105, 105, an intake valve drive shaft 3, which is driven for rotation by the crankshaft is supported to extend in a direction along a cylinder train.

Swing cams 4 each of which is in contact with a valve lifter 2a of intake valve 105 to drive to open or close said intake valve 105, are fitted to an outer surface of intake valve drive shaft 3, so as to be rotatable relative to intake valve drive shaft 3.

Between intake valve drive shaft 3 and swing cams 4, there is disposed a valve lift amount variable mechanism 112a or 112b which continuously varies the operating angle of corresponding intake valve 105 as well as the lift amount thereof.

Further, on one end portion of intake valve drive shaft 3, there is disposed a center phase variable mechanism 113a or 113b which changes a rotation phase of associated intake valve drive shaft 3 relative to the crankshaft to continuously vary the phase of the center of the operating angle of intake valve 105.

Figure 2:
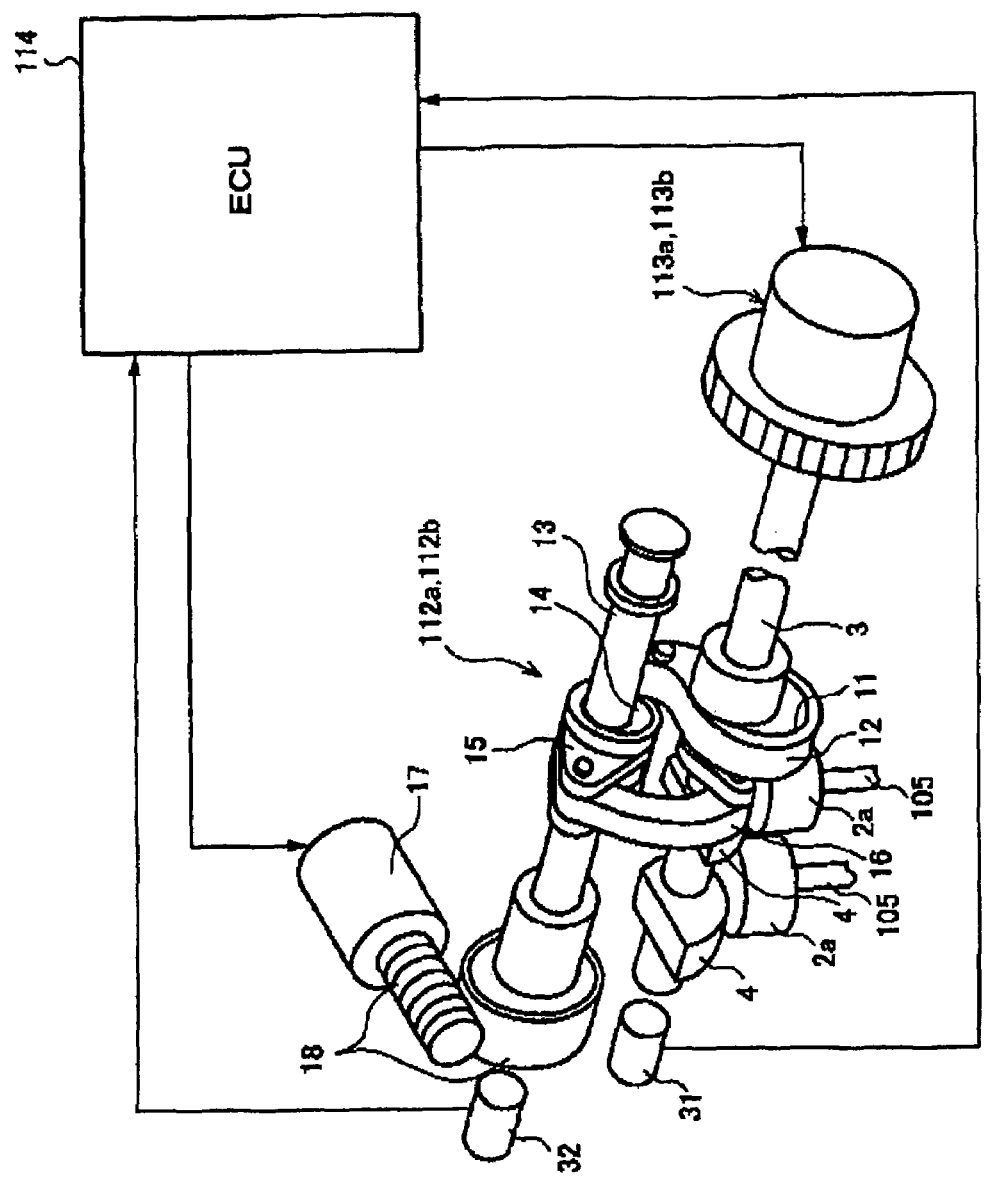
FIG. 2 is a perspective view showing a valve lift amount variable mechanism according to the embodiment of the present invention.
Figure 3:
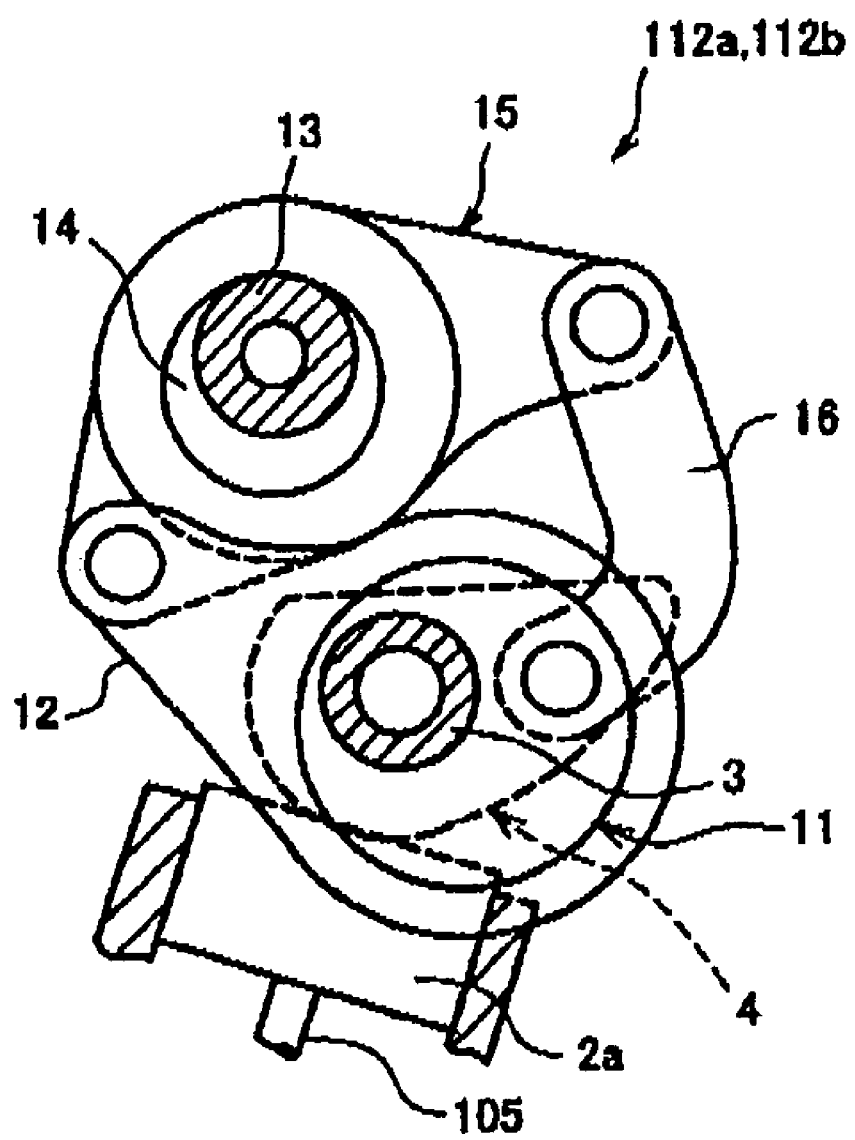
FIG. 3 is a side view of the valve lift amount variable mechanism.

As shown in FIGS. 2 and 3, each valve lift amount variable mechanism 112a or 112b includes: a drive cam 11 of circular shape which is fixedly disposed on intake valve drive shaft 3 in an eccentric state: a link 12 of ring shape which is fitted to an outer surface of drive cam 11 to be rotatable relative to drive cam 11; a control shaft 13 which extends in a direction of the cylinder train to be in approximately parallel with intake valve drive shaft 3; a control cam 14 of circular shape which is fixedly disposed on control shaft 13 in an eccentric state; a locker arm 15 which is fitted to an outer surface of control cam 14 to be rotatable relative to control cam 14, and also, is connected at one end thereof to a tip end of link 12 of ring shape; and a link 16 of rod shape which is connected to the other end of locker arm 15 and to swing cam 4.

Control shaft 13 is driven to rotate about its own axis by a motor 17 via a gear train 18 within a predetermined angle range.

According to the above configuration, when intake valve drive shaft 3 rotates in association with the crankshaft, ring shaped link 12 performs the approximate translation via drive cam 11 and also, locker arm 15 swings about the axle center of control cam 14, and further, swing cam 4 swings via rod shaped link 16, so that corresponding intake valve 105 is driven to open or close.

Further, by changing a rotating angle of control shaft 13, a position of the axle center of control cam 14, which is the swing center of locker arm 15, is changed, so that the orientation of swing cam 4 is changed.

As a result, the operating angle of intake valve 105 and the lift amount thereof are continuously changed to be increased or decreased, while the phase of the center of the operating angle of intake valve 105 being approximately fixed. Namely, when control shaft 13 is rotated in one direction, the valve lift amount is continuously changed to be increased, and at the same time, the valve operating angle is also continuously changed to be increased, whereas when control shaft 13 is rotated in a direction opposite to the one direction, the valve lift amount is continuously changed to be decreased, and at the same time, the valve operating angle is also continuously changed to be decreased.

Figure 4:
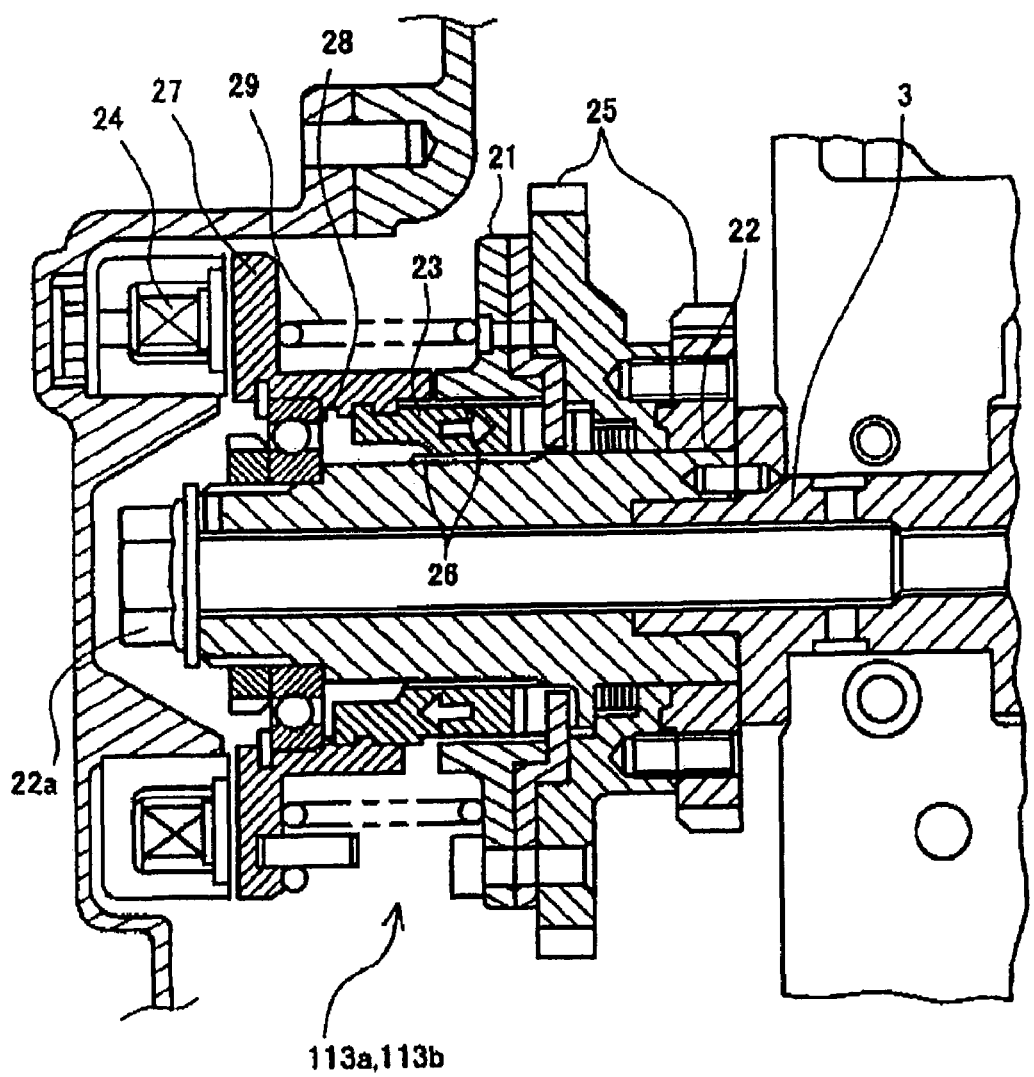
FIG. 4 is a cross-sectional view showing a center phase variable mechanism according to the embodiment of the present invention.

FIG. 4 shows each center phase variable mechanism 113a, 113b.

Each center phase variable mechanism 113a or 113b includes: a first rotator 21 which is fixed to a sprocket 25 rotated in synchronism with the crankshaft, to be rotated integrally with sprocket 25; a second rotator 22 which is fixed to one end of intake valve drive shaft 3 by means of a bolt 22a, to be rotated integrally with intake valve drive shaft 3; and a cylindrical intermediate gear 23 which is engaged with an inner peripheral face of first rotator 21 and an outer peripheral face of second rotator 22 by means of helical splines 26.

A drum 27 is connected to intermediate gear 23 via a thread screw 28, and a torsion spring 29 is disposed between drum 27 and intermediate gear 23.

Intermediate gear 23 is urged toward a retarded angle direction (left direction in FIG. 4) by torsion spring 29, and when a voltage is applied to an electromagnetic retarder 24 to generate a magnetic force, intermediate gear 23 is moved to an advanced angle direction (right direction in FIG. 4), via drum 27 and thread screw 28.

A relative phase between rotators 21 and 22 is changed according to a position of intermediate gear 23 in a shaft direction, so that a phase of intake valve drive shaft 3 relative to the crankshaft is changed.

Motor 17 and electromagnetic retarder 24 are controlled, based on control signals from electronic control unit 114.

Incidentally, the structure of each center phase variable mechanism 113a or 113b is not limited to the above, and it is possible to use a known mechanism, which varies the rotation phase of intake valve drive shaft 3 relative to the crankshaft.

Electronic control unit 114 sets a target angle of control shaft 13 (target valve lift amount), and feedback controls an actuating variable of power supply to motor 17, so that an actual angle detected by an angle sensor 32 approaches the target angle.

Further, electronic control unit 114 detects the rotation phase of intake valve drive shaft 3 relative to the crankshaft, based on a signal from an angle position sensor 31 for outputting a detection signal at a predetermined angle position of intake valve drive shaft 3 and the detection signal from crank angle sensor 117, and feedback controls an actuating variable of power supply to electromagnetic retarder 24.

Furthermore, electronic control unit 114 has a function of learning a correction value for correcting control process of each valve lift amount variable mechanism 112a, 112b, and a function of learning a correction value for correcting control process of each center phase variable mechanism 113a, 113b, so as to resolve an error in the intake air amount due to the deviation of actual characteristics of each valve lift amount variable mechanism 112a, 112b and of each center phase variable mechanism 113a, 113b from reference characteristics.

In the followings, there will be described the details of learning process for resolving the error in the intake air amount.

Figure 5:
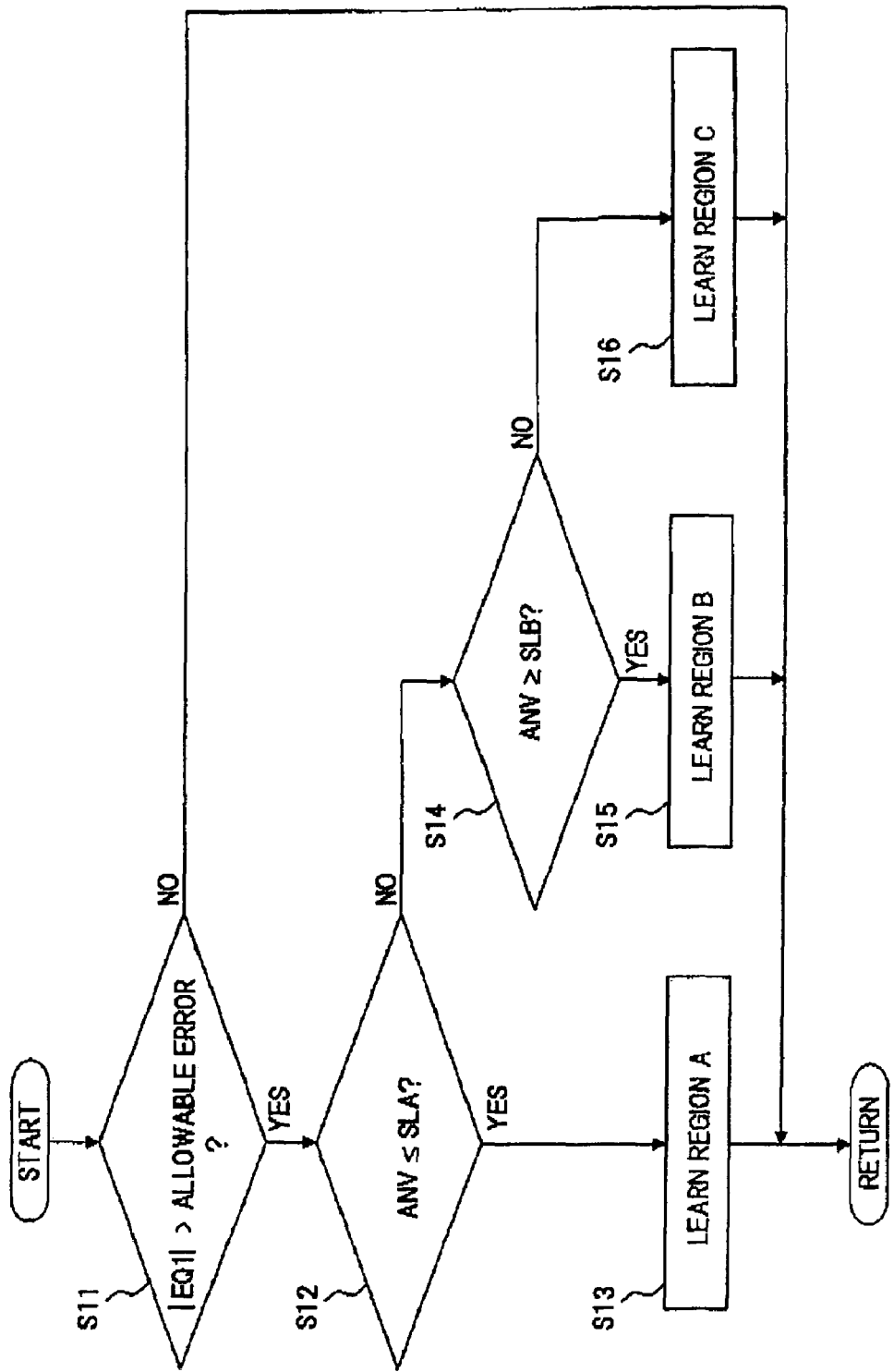
FIG. 5 is a flow chart showing a main routine of correction value learning process, based on a difference between a design value of an intake air amount and an actually measured value thereof according to the embodiment of the present invention.

A flowchart of FIG. 5 shows a main routine of the learning process.

In the flowchart of FIG. 5, firstly, in step S11, it is judged whether or not an absolute value of an error EQ1 in the intake air amount at the time exceeds a previously stored allowable error.

Here, the error EQ1 in the intake air amount is obtained as a difference between an actual intake air amount detected by air flow sensor 115, and an intake air amount estimated based on the operating angle of intake valve 105 at the time, the valve lift amount thereof and the phase of the center thereof, and further, operating conditions such as an engine rotating speed and the like.

Incidentally, in the case where the error EQ1 is calculated in the above manner, engine 101 may be an in-line engine, a V-type engine comprising a plurality of banks, or a horizontally opposed engine.

If the absolute value of the error EQ1 exceeds the allowable error, it is judged that the actually measured value of the intake air amount deviates from the estimated value thereof, since the operating angle of intake valve 105, the valve lift amount thereof and the phase of the center thereof deviate from reference values corresponding to the actuating variables of each valve lift amount variable mechanism 112a, 112b and each center phase variable mechanism 113a, 113b.

Therefore, if it is judged that the absolute value of the error EQ1 exceeds the allowable error, the routine proceeds to step S12 in order to make the absolute value of the error EQ1 to be in the allowable error.

In step 12, it is judged whether or not a value ANV which is obtained by dividing an opening area VAA of intake valve 102 at the time by the engine rotating speed NE and volume displacement VOL (ANV=VAA/NE/VOL), is equal to or smaller than a threshold SLA.

Note, the opening area VAA is a value obtained by integrating the lift amount of intake valve 105 at each unit crank angle.

The threshold SLA is equivalent to a maximum value of ANV in an operating region A where a flow rate of air passing through intake valve 105 reaches a sonic speed and the intake air amount of engine 101 is changed in proportion to the opening area of intake valve 105.

Figure 6:
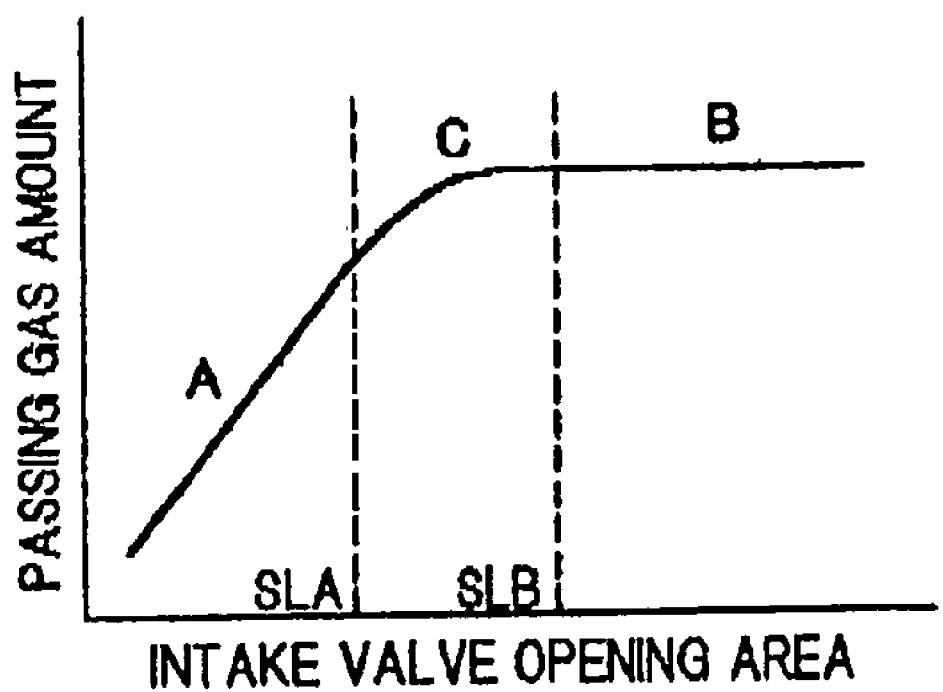
FIG. 6 is a graphical view showing several sections of the operating region of an engine, according to the embodiment of the present invention.

If ANV is equal to or smaller than the threshold SLA, it is judged that the current operating condition corresponds to the operating region A (refer to FIG. 6).

Then, if the current operating condition corresponds to the operating region A, the routine proceeds to step 13 to learn the correction value for correcting the control process of each valve lift amount variable mechanism 112a or 112b.

Namely, in the operating region A, the deviation of the phase of the center which can be varied by each center phase variable mechanism 113a or 113b from the reference value does not greatly influence on the error EQ1, and the error EQ1 entirely occurs due to the deviation of the valve operating angle and the valve lift amount by each valve lift amount variable mechanism 112a or 112b from the reference values.

Therefore, in the operating region A, it is assumed that the error EQ1 all occurs due to the deviation of the valve operating angle and the valve lift amount from the reference values, the correction value for correcting the control process of each valve lift amount variable mechanisms 112a or 112b is learned.

On the other hand, if it is judged in step 12 that ANV exceeds the threshold SLA, the routine proceeds to step 14 where it is judged whether or not ANV is equal to or larger than a threshold SLB.

The threshold SLB is equivalent to a minimum value of ANV in an operating region B where the intake air amount of engine is not substantially changed relative to the change in the opening area of intake valve 105, and if ANV is equal to or larger than the threshold SLB, it is judged that the current operating condition corresponds to the operating region B (refer to FIG. 6).

Then, if the current operating condition corresponds to the operating region B, the routine proceeds to step 15 to learn the correction value for correcting the control process of each center phase variable mechanism 113a or 113b.

Namely, in the operating region B, the deviation of the valve operating angle and the valve lift amount in each valve lift amount variable mechanisms 112a or 112b from the reference values does not greatly influence on the error EQ1, and the error EQ1 entirely occurs due to the deviation of the phase of the center by each center phase variable mechanism 113a or 113b from the reference value.

Therefore, in the operating region B, it is assumed that the error EQ1 all occurs due to the deviation of the phase of the center from the reference value, the correction value for correcting the control process of each center phase variable mechanism 113a or 113b is learned.

On the other hand, if it is judged in step 14 that ANV is smaller than the threshold SLB, it is judged that the current operating condition corresponds to an operating region C (an intermediate operating region) that extends between the operating region A and the operating region B (refer to FIG. 6).

The operating region C is a region where the error EQ1 can occur due to the deviation of the valve operating angle and the valve lift amount by each valve lift amount variable mechanism 112a or 112b from the reference values, and also can occur due to the deviation of the phase of the center by each center phase variable mechanism 113a or 113b from the reference value.

If the current operating condition corresponds to the operating region C, the routine proceeds to step S16 where the error EQ1 is served to each valve lift amount variable mechanism 112a or 113a and each center phase variable mechanism 113a or 113b, to thereby learn the respective correction values.

Further, if it is judged in step S11 that the absolute value of the error EQ1 is equal to or less than the allowable error, since it is unnecessary to update the correction values, the routine is terminated just as it is.

Figure 7:
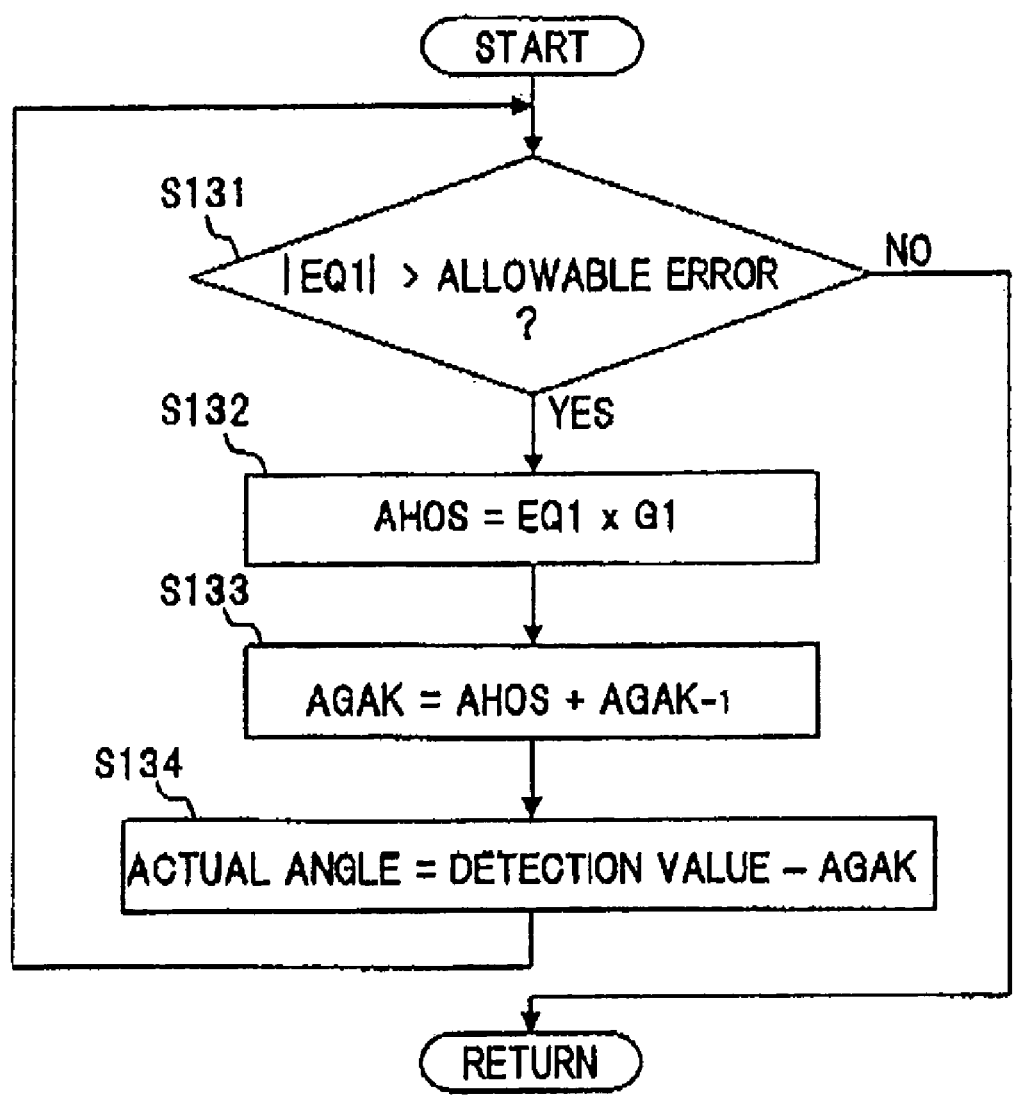
FIG. 7 is a flowchart showing correction value learning process executed based on a control error in the intake air amount within an operating region A, according to the embodiment of the present invention.

A flowchart of FIG. 7 shows the details of learning in step S13.

In step S131, it is judged whether or not the absolute value of the error EQ1 exceeds the allowable error, and if the absolute value of the error EQ1 exceeds the allowable error, the routine proceeds to step S132.

In step S132, the error EQ1 is multiplied with a conversion coefficient G1, to thereby calculate a correction value AHOS.

In next step S133, the correction value AHOS is added to an immediately previous value $AGA_{-1}$ of a learning correction value AGAK and a result of addition is stored as a new learning correction value AGAK.

In step S134, the detection result of angle sensor 32 is corrected with the learning correction value AGAK, and the actuating variable for each valve lift amount variable mechanism 112a, 112b is feedback controlled based on the angle detection value after correction.

In the case where the actual intake air amount is less than the target intake air amount for example, the learning correction value AGAK is set so that the angle of control shaft 13 is detected at an angle on a lower valve lift side, and thus, the operating angle of each intake valve 105 and the lift amount thereof are controlled to become larger.

During the absolute value of the error EQ1 exceeds the allowable error, the process of steps S132 to S134 is repetitively executed.

Figure 8:
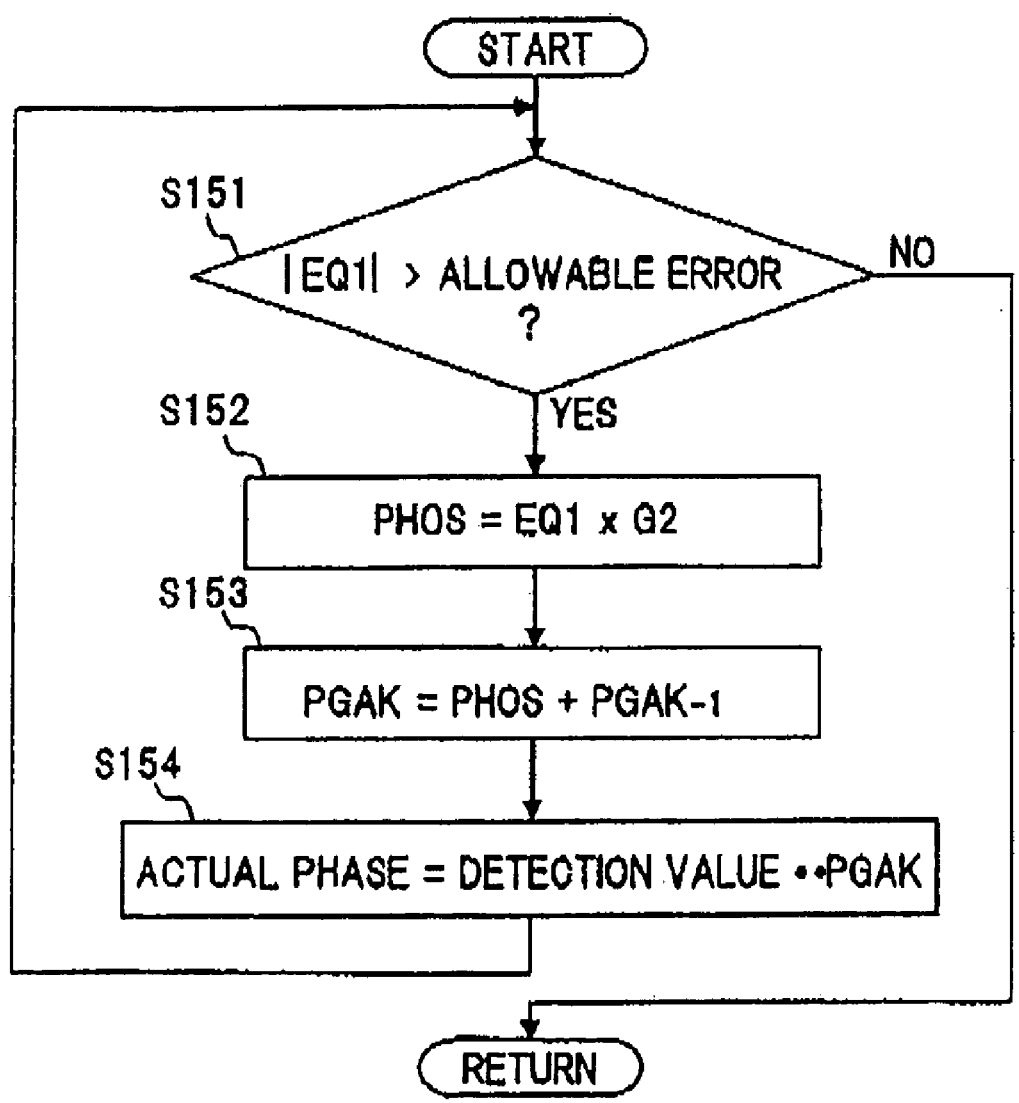
FIG. 8 is a flowchart showing correction value learning process, based on the control error in the intake air amount in an operating region B according to the embodiment of the present invention.

On the other hand, a flowchart of FIG. 8 shows the details of learning in step S15.

In step S151, it is judged whether or not the absolute value of the error EQ1 exceeds the allowable error, and if the absolute value of the EQ1 exceeds the allowable error, the routine proceeds to step S152.

In step S152, the error EQ1 is multiplied with a conversion coefficient G2, to thereby calculate a correction value PHOS.

In next step S153, the correction value PHOS is added to an immediately previous value $PGAK_{-1}$ of a learning correction value PGAK and a result of addition is stored as a new learning correction value PGAK.

In stop S154, the detection result of the phase of the center is corrected with the learning correction value PGAK, and the actuating variable for each center phase variable mechanism 113a, 113b is feedback controlled based on the phase of the center detection value after correction.

In case where the actual intake air amount is less than the target intake air amount for example, the learning correction value PGAK is set so that the rotation phase is detected at a side on which the intake air amount becomes less and thus, the phase of the center of the operating angle of each intake valve 105 is controlled so that the intake air amount is increased.

During the absolute value of the error EQ1 exceeds the allowable error, the process of steps S152 through S154 is repetitively executed.

Figure 9:
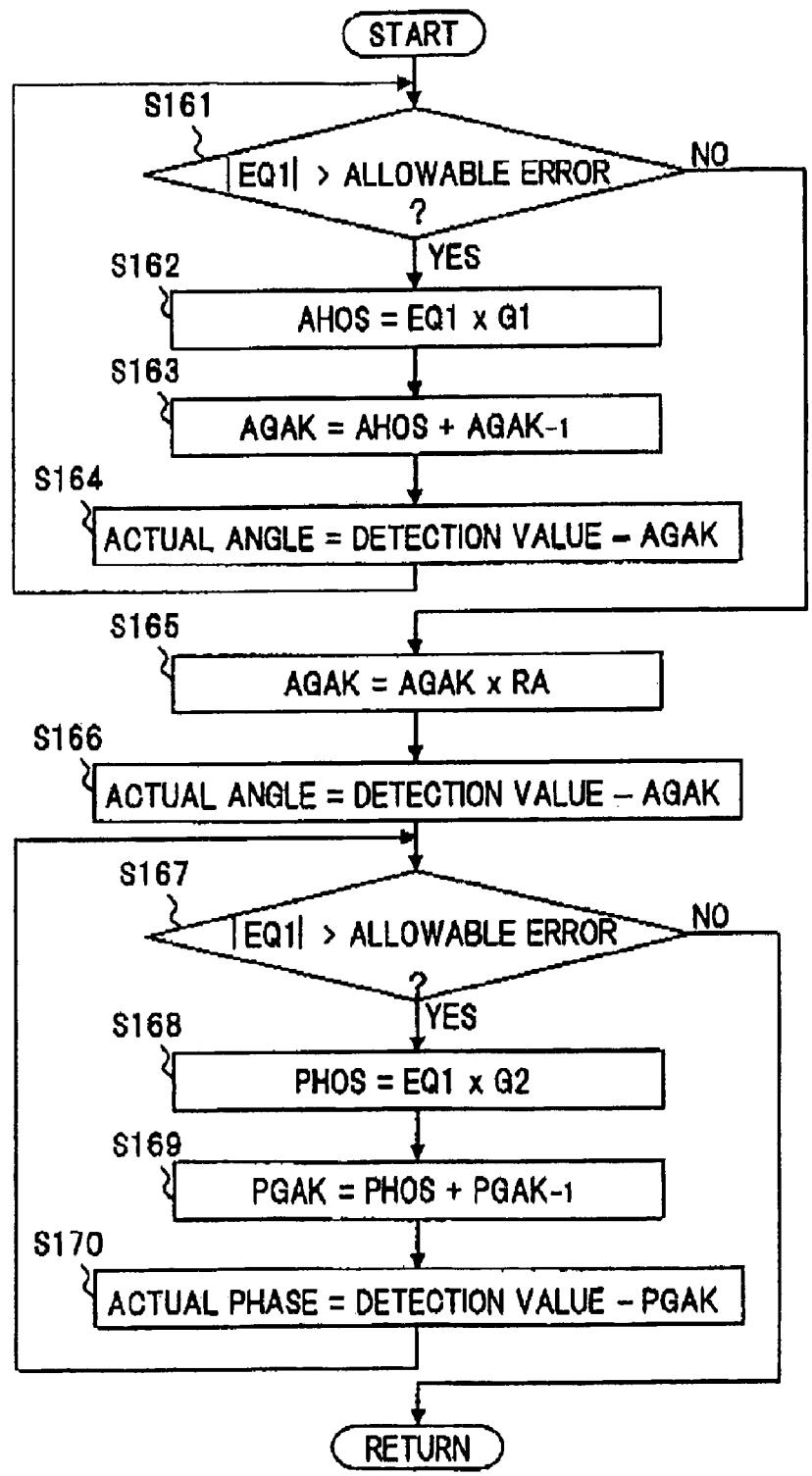
FIG. 9 is a flowchart showing correction value learning process, based on the control error in the intake air amount in an operating region C.

A flowchart of FIG. 9 shows the details of learning in step S16.

In steps S161 to S164, similarly to steps S131 to S134 in the flowchart of FIG. 7, it is assumed that the error EQ1 at the time occurs due to only the deviation of the valve operating angle and the valve lift amount from the reference values, and the learning correction value AGAK is updated.

Then, if it is judged in step S161 that the absolute value of the error EQ1 is equal to or less than the allowable error, the routine proceeds to step S165.

In step S165, the learning correction value AGAK updated in step S168 is multiplied with an influence ratio RA, to be converted into the learning correction value corresponding to an error component due to the deviation of the valve operating angle and the valve lift amount from the reference values, in the error EQ1.

In the learning in steps S161 to 164, it is assumed that the error EQ occurs due to only the deviation of the valve operating angle and the valve lift amount from the reference values, and the learning correction value AGAK is updated.

However, in the operating region C, the error EQ1 occurs due to the deviation of the valve operating angle and the valve lift amount from the reference values and also occurs due to the deviation of the phase of the center from the reference value. Therefore, normally, the error EQ1 needs to be separated into an error component which occurs due to the deviation of the valve operating angle and the valve lift amount from the reference values and an error component which occurs due to the deviation of the phase of the center from the reference value, to thereby be learned.

Therefore, the influence ratio RA, that is the ratio between the influence on the valve operating angle and that on the valve lift amount, relative to the error EQ1 at that time is estimated, and the learning result in step S163 is corrected with the influence ratio RA, so that the learning correction value AGAK corresponding to the error component depending only on the valve operating angle and the valve lift amount is obtained.

Here, the influence ratio RA is calculated based on an intake air amount OS estimated by assuming that the intake air amount is changed in proportion to the opening area of intake valve 105 and an actual intake amount QA detected by air flow sensor 115, as the influence ratio RA=QA/OS (note, $1 \geqq RA \geqq 0$).

Figure 10:
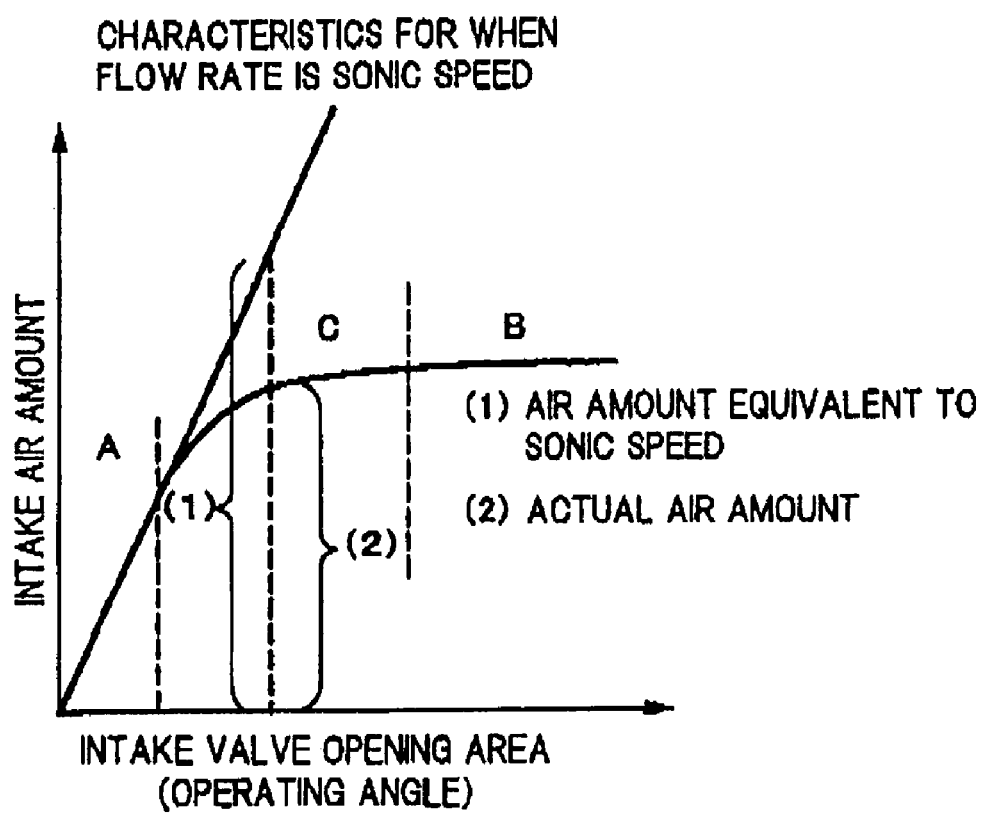
FIG. 10 is a graph for explaining influence ratio in the operating region C according to the embodiment of the present invention.

As shown in FIG. 10, the influence ratio RA is set at a value near 1 in the vicinity of the boundary to the operating region A, and is set to be smaller as the operating condition approaches the operating region B. Such a tendency of the influence ratio RA corresponds to that the influence by the valve operating angle and the valve lift amount in relation to the error EQ1 becomes larger as approaching to the operating region A, whereas the influence by the phase of the center in relation to the error EQ1 becomes larger as the operating condition approaches the operating region B.

In step 165, the learning correction value AGAK is corrected with the influence ratio RA, to thereby obtain the learning correction value AGAK corresponding to the error component depending only on the valve operating angle and the valve lift amount, and then, the routine proceeds to step S166.

In step S166, the detection result of angle sensor 32 is corrected based on the learning correction value AGAK corrected with the influence ratio RA and the actuating variable for each valve lift amount variable mechanism 112a, 112b is feedback controlled using the angle detection value after correction.

By the above feedback control, the error component influenced by the valve operating angle and the valve lift amount, in the error EQ1, is resolved, and accordingly, it is assumed that the error EQ1 occurring in this state depends on the phase of the center.

Therefore, in steps S167 to S170, similarly to steps S151 to S154 in the flowchart of FIG. 8, a phase of the center learning value is learned to be updated, so that the error EQ1 finally becomes equal to or less than the allowable error.

According to the above configuration, in the operating regions A and B, the error EQ1 depending on the valve operating angle and the valve lift amount and the error EQ1 depending on the phase of the center can be learned at high accuracy.

On the other hand, also in the intermediate region C between the operating regions A and B, where the error EQ1 occurs by being influenced by both of the valve operating angle and the valve lift amount and of the phase of the center, the error EQ1 can be learned by being separated into the error component depending on the valve operating angle and the valve lift amount and the error component depending on the phase of the center.

Accordingly, even in case where an opportunity for the current operating condition to correspond to the operating region A or the operating region B for example, the chance of learning can be sufficiently ensured, so that a state in which the error in the intake air amount occurs can be promptly resolved, to thereby improve the controllability of the intake air amount.

Incidentally, in the operating region C, it is possible that the learning correction value PGAK is learned on the assumption that the error EQ1 all occurs depending on the phase of the center, and after the learning is converged, the learning correction value PGAK is corrected with an influence ratio RP of the phase of the center, and further, the error EQ1 in the corrected state by the learning correction value PGAK after correction is learned as the error component depending on the valve operating angle and the valve lift amount.

Incidentally, the influence ratio $RP=1-QA/QS$(note, $1 \geq RP \geq 0$).

In place of making the difference between the actual intake amount and the intake air amount estimated based on the operating angle of intake valve 105, the lift amount thereof and the phase of the center thereof, to be the error EQ1 in the intake air amount, in the V-type engine 101 in the present embodiment, it is possible to learn the correction values for correcting the control process of each valve lift amount variable mechanism 112a, 112b and for correcting the control process of each center phase variable mechanism 113a, 113b, so that the difference of intake air amount between banks is resolved.

Figure 11:
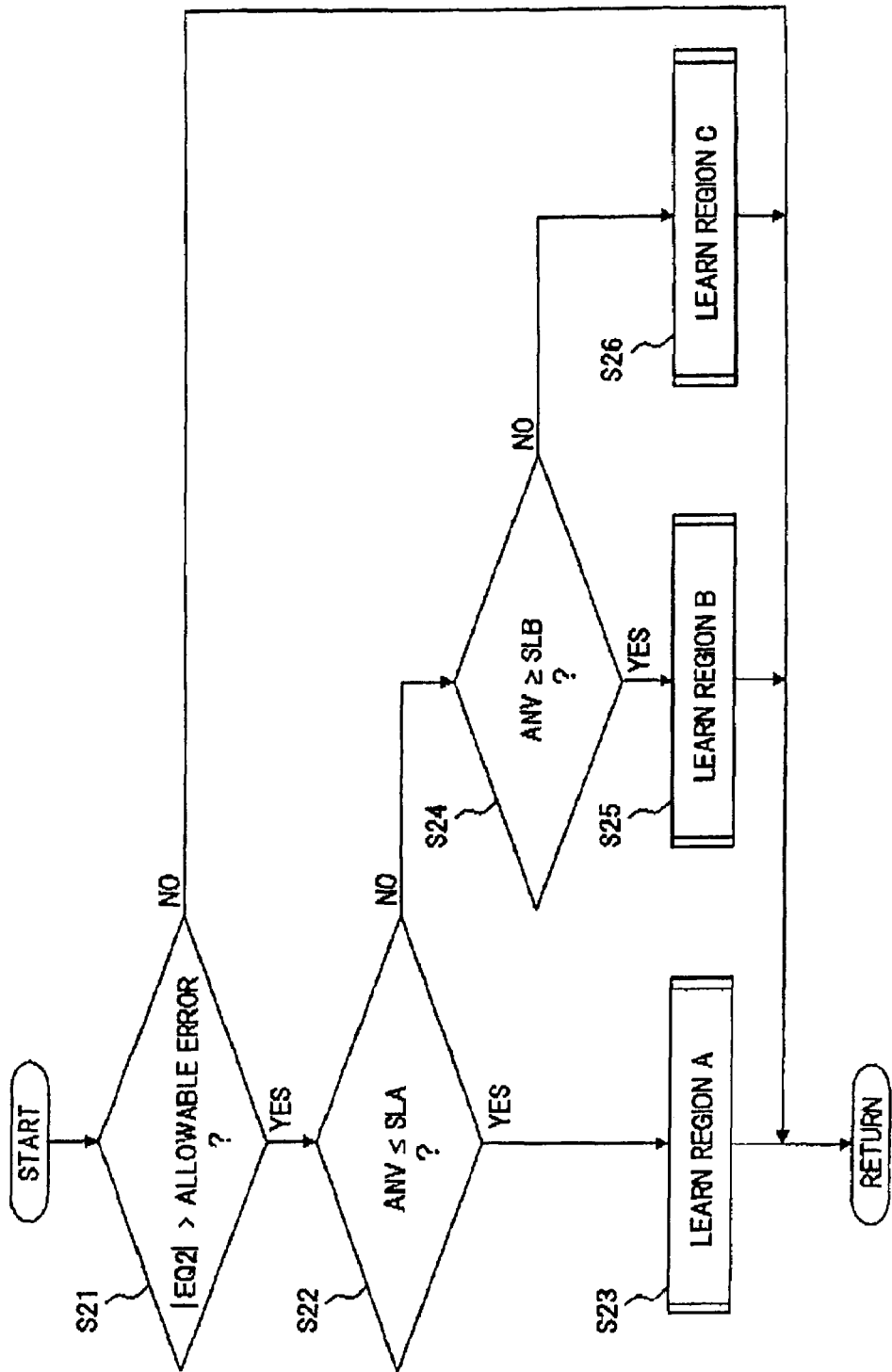
FIG. 11 is a flowchart showing a main routine of correction value learning process, based on an intake air amount difference between banks, according to the embodiment of the present invention.

A flowchart of FIG. 11 shows a main routine of learning process based on the difference of intake air amount between the banks.

In step S21, it is judged whether or not an absolute value of an error EQ2 showing the difference of intake air amount between the banks exceeds an allowable error.

Then, if the absolute value of the error EQ2 exceeds the allowable error, the routine proceeds to steps S22 to S26, and similarly to steps S12 to S16, ANV is compared with the thresholds SLA and SLB, and thereafter, it is discriminated whether the current operating conditions corresponds to the operating region A, the operating region B or the operating region C, and the learning process is performed for each of the operating regions A, B and C.

Here, if there is a difference of intake air amount between the banks, there is caused a torque difference between the banks. Therefore, the torque difference between the banks can be computed as the error EQ2.

Figure 12:
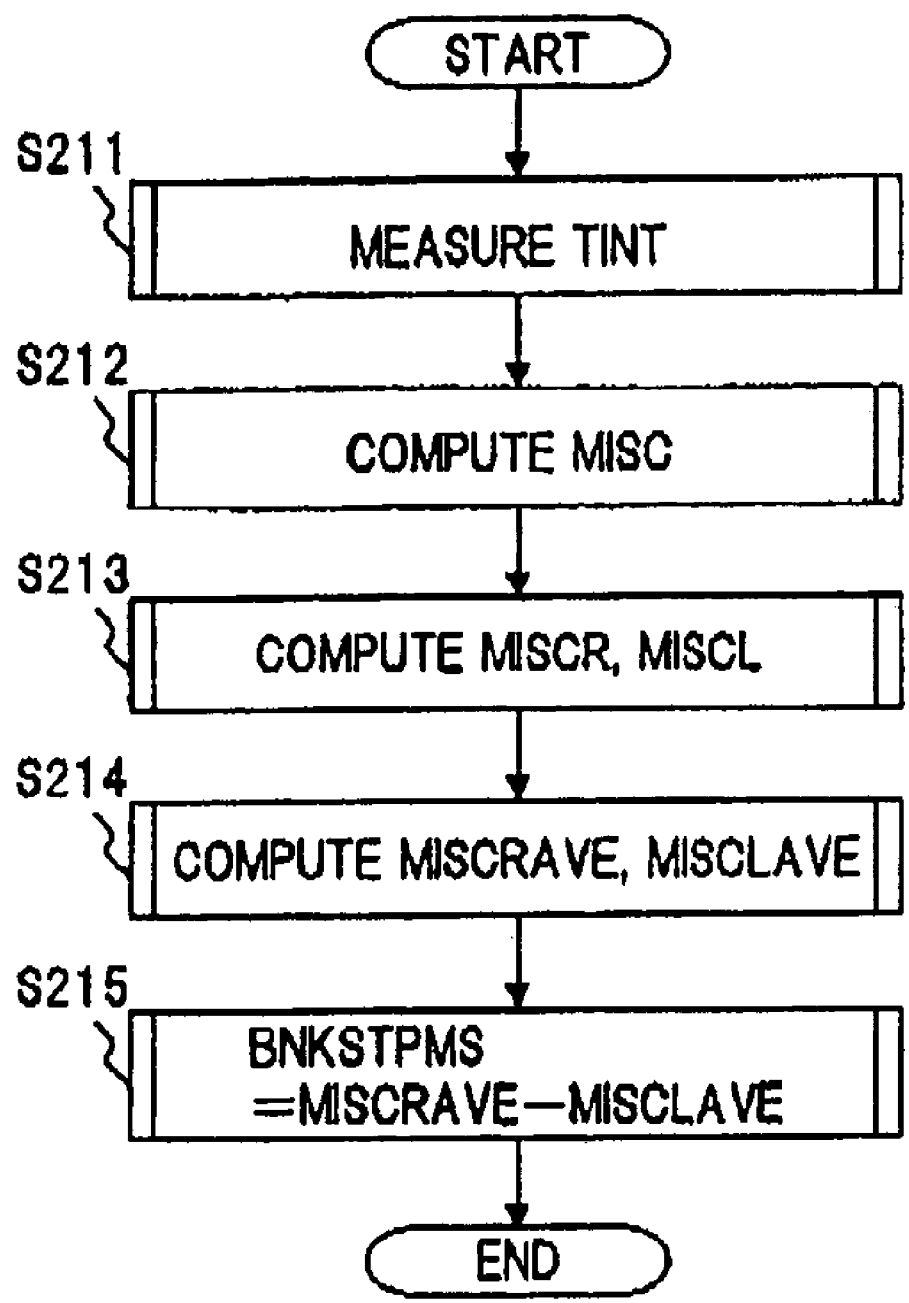
FIG. 12 is a flowchart showing process of obtaining a torque difference between the banks in the embodiment of the present invention.

A flowchart of FIG. 12 shows process of computing the torque difference between the banks.

In the flowchart of FIG. 12, in step S211, a reference crank angle position at each ignition interval is detected based on the detection signal from crank angle sensor 117, to thereby measure a cycle TINT of the reference crank angle position.

In step S212, based on the cycle TINT, a value MISC is computed, which indicates the torque difference between cylinders of which strokes deviate from each other by one rotation of engine 101.

In the computation of MISC, for the cycle TINT, all of data of the newest value TINT1 through the previous data of TINTn that have occurred before the predetermined number of cycles is stored in time series. Namely, "n" of TINTn is a positive integer, and accordingly, if "n"=2, an immediately previous value is indicated, and if "n"=3, a value before the immediately previous value is indicated.

Then, the following calculation is performed at each time when the cycle TINT is updated.

Herein, engine 101 is a V-type six-cylinders engine.

$$MISB = \frac{2 \times (TINT7 - TINT10) + 3 \times (TINT7 - TINT4)}{TINT9^3 \times TP}$$

$$MISC = MISB2 - MISB3$$

In the above formulae, TP is basic injection pulse width in proportion to a cylinder intake air amount, and MISB2 is an immediately previous value of MISB, and MISB3 is a value before the immediately previous value MISB2 of MISB.

In step S213, a left bank component MISCL and a right bank component MISCR are obtained from MISC.

In V-type six-cylinders engine 101, the left bank comprises #1 cylinder, #3 cylinder and #5 cylinder, and the right bank comprises #2 cylinder, #4 cylinder and #6 cylinder, and an ignition order is #1 cylinder→#2 cylinder→#3 cylinder→#4 cylinder→#4 cylinder→#6 cylinder.

In this case, if the ignition interval is at 120° of crank angle, combinations of cylinders of which strokes deviate from each other by one rotation of engine 101 are #1 cylinder and #4 cylinder, #2 cylinder and #5 cylinder, and #3 cylinder and #6 cylinder.

Then, in the case where MISC indicates the torque difference between #1 cylinder and #4 cylinder for example, a torque increase/decrease portion of #1 cylinder relative to an average torque between #1 cylinder and #4 cylinder is obtained based on MISC, to be made the left bank component MISCL, and a torque increase/decrease portion of #4 cylinder relative to the average torque is obtained to be made the right bank component MISCR.

Further, in step S214, the left bank component MISCL and the right bank component MISCR are moving-averaged, respectively, and filter process is performed for obtaining average values MISCLAVE and MISCRAVE.

Then, in step S215, a torque difference BNKSTPMS between the banks is calculated based on the average values MISCLAVE and MISCRAVE.

$$BNKSTPMS=MISCRAVE-MISCLAVE$$

In the case where the torque difference BNKSTPMS between the banks is calculated in accordance with the flowchart of FIG. 12, it is assumed that the torque difference BNKSTPMS is equivalent to the error EQ2 indicating the difference of intake air amount between the banks, and it is judged in step S21 whether or not an absolute value of the torque difference BNKSTPMS exceeds an allowable error.

Figure 13:
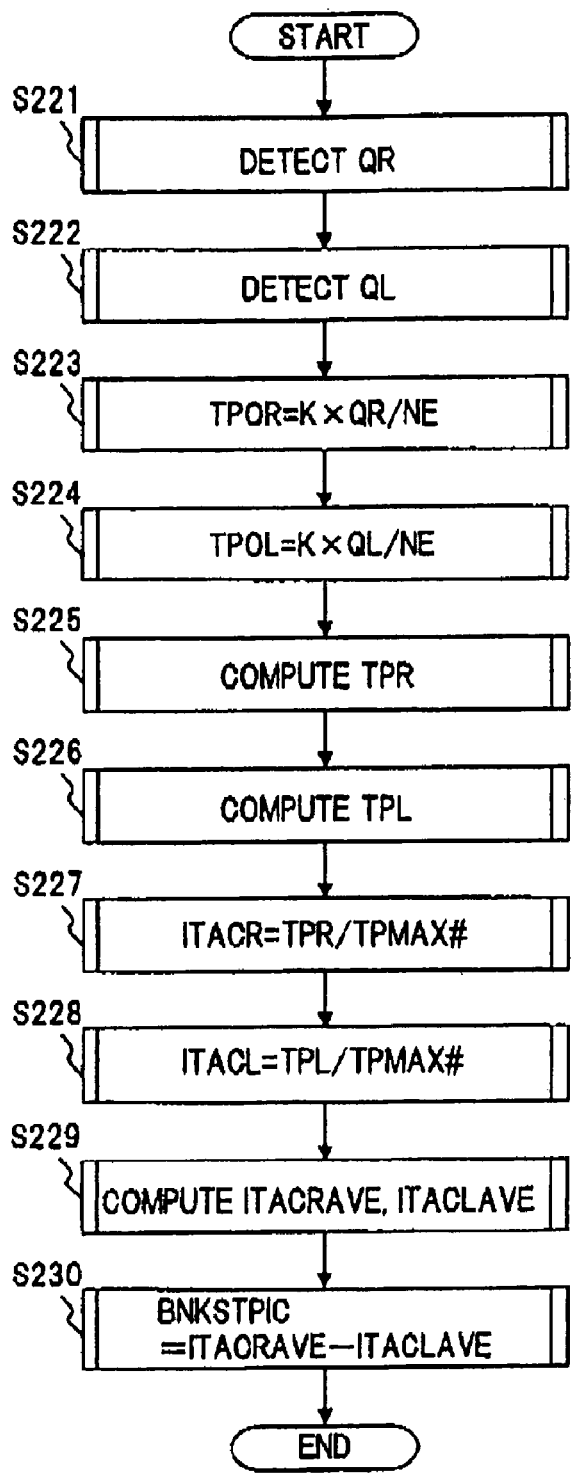
FIG. 13 is a flowchart showing process of obtaining a charging efficiency difference between the banks, according to the embodiment of the present invention.

A flowchart of FIG. 13 shows process of computing a difference of charging efficiency between the banks as a value indicating the error EQ2 in intake air amount between the banks.

Incidentally, in the case where the difference of charging efficiency between the banks is computed in accordance with the flowchart of FIG. 13, in order to measure an intake air flow amount individually for each bank, air flow sensor 115 is individually provided for the right bank and the left bank.

In step S221, an intake air flow amount (i.e., a flow amount of intake air) QR in the right bank is detected based on the detection signal from air-flow sensor 115 provided on the right bank.

In step S222, an intake air flow amount QL in the left bank is detected based on the detection signal from air-flow sensor 115 provided on the left bank.

In step S223, basic fuel injection pulse width TP0R equivalent to a cylinder air amount in the right bank is computed according to the equation below.

$$TP0R=K \times QR/NE$$

In the above formula, K is a constant, NE is the engine rotating speed (rpm).

In step S224, basic fuel injection pulse width TP0L equivalent to a cylinder air amount in the left bank is computed according to the equation below.

$$TP0L=K \times QL/NE$$

In step S225, the basic fuel injection pulse width TP0R of the right bank is processed to be flattened, and a result thereof is made to be TPR.

In step S226, the basic fuel injection pulse width TP0L of the left bank is processed to be flattened, and a result thereof is made to be TPL.

In step S227, charging efficiency ITACR of the right bank is computed by the equation below, using basic fuel injection pulse width TPMAX# for when the valve is fully opened and TPR.

$$ITACR=TPR/TPMAX\#$$

In step S228, charging efficiency ITACL of the left bank is computed by the equation below, using the basic fuel injection pulse width TPMAX# for when the valve is fully opened and TPL.

$$ITACL=TPL/TPMAX\#$$

In step S229, the charging efficiency ITACR of the right bank and the charging efficiency ITACL of the left bank are respectively processed to be flattened, and results thereof are made to be ITACRAVE and ITACLAVE.

In step S230, a charging efficiency difference BNKTPIC between the banks is computed by the equation below, based on the average charging efficiency ITACRAVE of the right bank and the average charging efficiency ITACLAVE of the left bank.

$$BNKSTPIC=ITACRAVE-ITACLAVE$$

Then, in the case where the charging efficiency difference BNKSTPIC between the banks is calculated in accordance with the flowchart of FIG. 13, it is judged in step S21 whether or not an absolute value of BNKSTPIC exceeds an allowable error.

Figure 14:
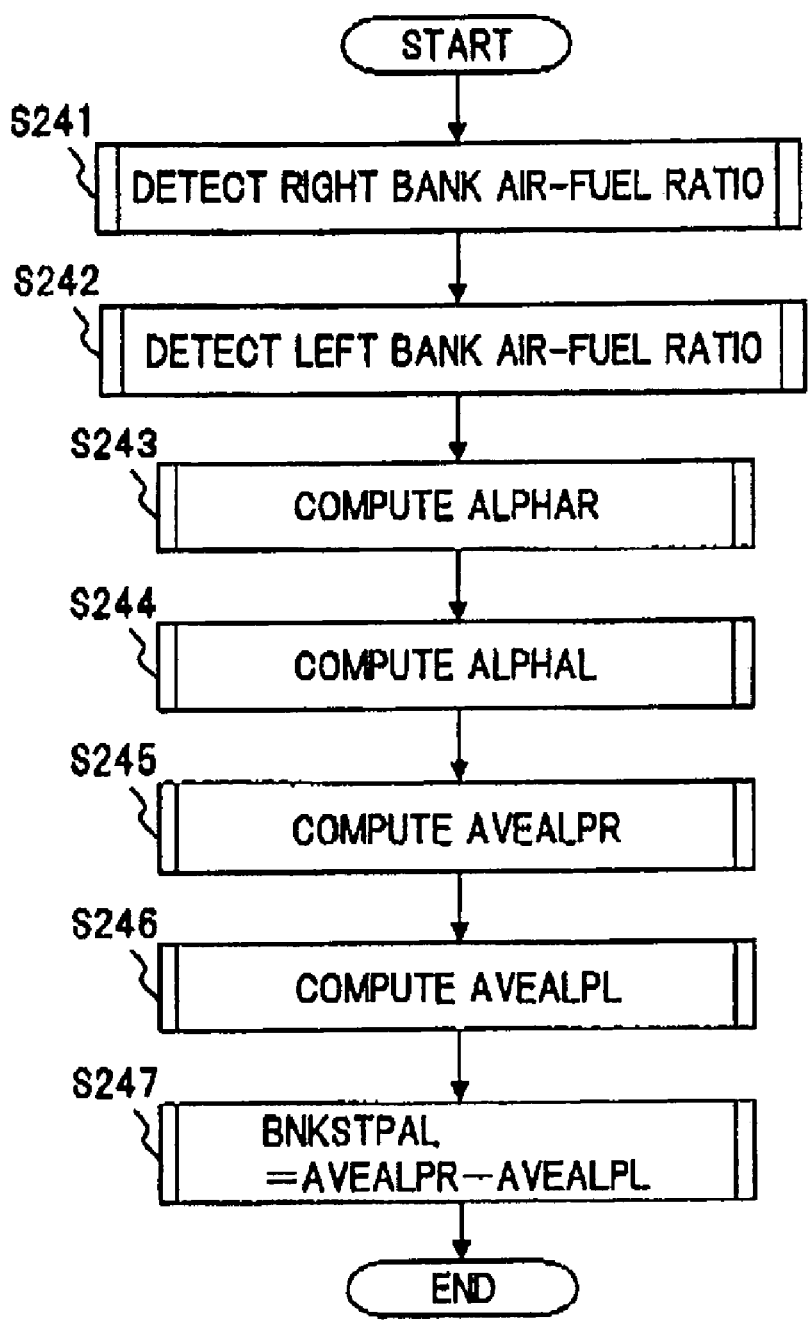
FIG. 14 is a flowchart showing process of obtaining an air-fuel ratio difference between the banks, according to the embodiment of the present invention.

A flowchart of FIG. 14 shows process of obtaining a difference of air-fuel ratio between the banks as a value indicating the error EQ2 in intake air amount between the banks.

In the case where a fuel injection amount is computed on the assumption that the same amount of intake air amount is in each bank, if the actual intake air amount is different from each other in the banks, the air-fuel ratio is also different from each other in the banks, and therefore, the difference of air-fuel ratio between the banks indicates the difference of intake air amount between the banks.

In the flowchart of FIG. 14, in step S241, a detection signal from an air-fuel ratio sensor 111a on the right bank is read in.

In step S242, a detection signal from an air-fuel ratio sensor 111b on the left bank is read in.

In step S243, a feedback correction coefficient ALPHAR for coinciding an actual air-fuel ratio of the right bank to a target air-fuel ratio is computed based on the air-fuel ratio of the right bank detected by air-fuel ratio sensor 111a.

The correction coefficient ALPHAR is used for correcting the fuel injection amount of the right bank.

In step S244, a feedback correction coefficient ALPHAL for coinciding an actual air-fuel ratio of the left bank to a target air-fuel ratio is computed based on the air-fuel ratio of the left bank detected by air-fuel ratio sensor 111b.

The correction coefficient ALPHAL is used for correcting the fuel injection amount of the left bank.

In step S245, the air-fuel ratio feedback correction coefficient ALPHAR of the right bank is processed to be flattened, and a result thereof is made to be AVEALPR.

In step S246, the air-fuel ratio feedback correction coefficient ALPHAL of the left bank is processed to be flattened, and a result thereof is made to be AVEALPL.

In step S247, an air-fuel ratio difference BNKSTPAL between the banks is computed by the equation below, based on the average correction coefficient AVEALPR of the right bank and the average correction coefficient AVEALPL of the left bank.

$$BNKSTPAL=AVEALPR-AVEALPL$$

Then, in the case where the air-fuel ratio difference BNKSTPAL between the banks is calculated in accordance with the flowchart of FIG. 14, it is judged in step S21 whether or not an absolute value of the air-fuel ratio difference BNKSTPAL exceeds an allowable error.

If it is judged in step S21 in the flowchart of FIG. 11 that the absolute value of the error EQ2 (EQ2=BNKSTPMS or BNKSTPIC or BNKSTPAL) in intake air amount between the banks exceeds the allowable error, the routine proceeds to step S22 where it is judged whether or not ANV is equal to or smaller than the threshold SLA.

Then, if ANV is equal to or smaller than the threshold SLA and the operating conditions correspond to the operating region A, the routine proceeds to step S23 where the correction value for correcting the control process of each valve lift amount variable mechanism 112a, 112b is learned.

Figure 15:
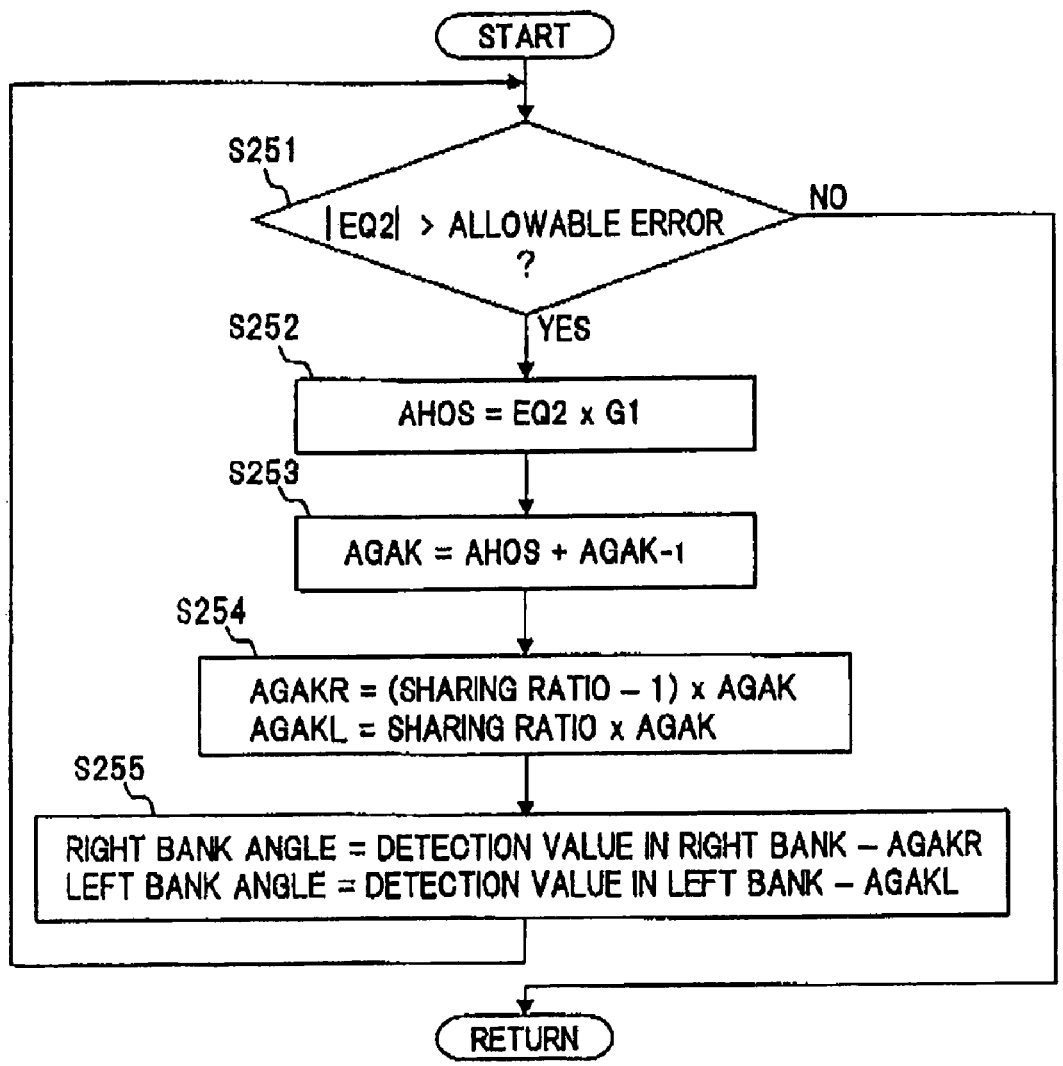
FIG. 15 is a flowchart showing correction value learning process, based on the intake air amount difference between the banks in the operating region A, according to the embodiment of the present invention.

The details of the process in step S23 is shown in a flowchart of FIG. 15.

In step S251, it is judged whether or not the error EQ2 (EQ2=BNKSTPMS or BNKSTPIC or BNKSTPAL) in intake air amount between the banks exceeds the allowable error, and if the error EQ2 exceeds the allowable error, the routine proceeds to stop S252.

In step S252, the error EQ2 is multiplied with the conversion coefficient G1, to thereby calculate the correction value AHOS.

In next step S253, the correction value AHOS is added to the immediately previous value $AGAK_{-1}$ of the learning correction value AGAK and a result of addition is stored as a new learning correction value AGAK.

In step S254, the learning correction value AGAK is separated into a learning correction value AGAKR for the right bank and a learning correction value AGAKL for the left bank.

The learning correction value AGAK obtained in step S253 is obtained as a value capable of resolving the difference of intake air amount by correcting the intake air amount in either one of the banks. However, if the intake air amount of the bank in which the intake air amount is relatively large is decreased and also, the intake air amount of the bank in which the intake air amount is relatively small is increased, the difference of intake air amount between the banks can be reduced.

Therefore, in step S254, the learning correction value AGAKR for the right bank is calculated as "AGAKR=(sharing ratio−1)×AGAK", and the learning correction value AGAKL for the left bank is calculated as "AGAKL=sharing ratio×AGAK".

For example, if the sharing ratio is 0.5, the requirement for resolving the difference of intake air amount between the banks is evenly served to each of the banks, so that the intake air amount of the bank in which the intake air amount is smaller is increased by half the difference of intake air amount, and the intake air amount of the bank in which the intake air amount is larger is decreased by half the difference of intake air amount.

In step S255, the detection results by angle sensor 32 in the right and left banks are respectively corrected with the corresponding learning correction values AGAKR and AGAKL, and the actuating variable for each valve lift amount variable mechanism 112a, 112b is feedback controlled based on each angle detection value after correction.

Then, during the absolute value of the error EQ2 (EQ2=BNKSTPMS or BNKSTPIC or BNKSTPAL) exceeds the allowable error, the process in steps S252 to S255 is repetitively executed.

On the other hand, if it is judged in step S24 in the flowchart of FIG. 11 that ANV is equal to or larger than the threshold SLB and the operating conditions correspond to the operating region B, the routine proceeds to step S25 where the correction value in the control process of each center phase variable mechanism 113a, 113b is learned.

Figure 16:
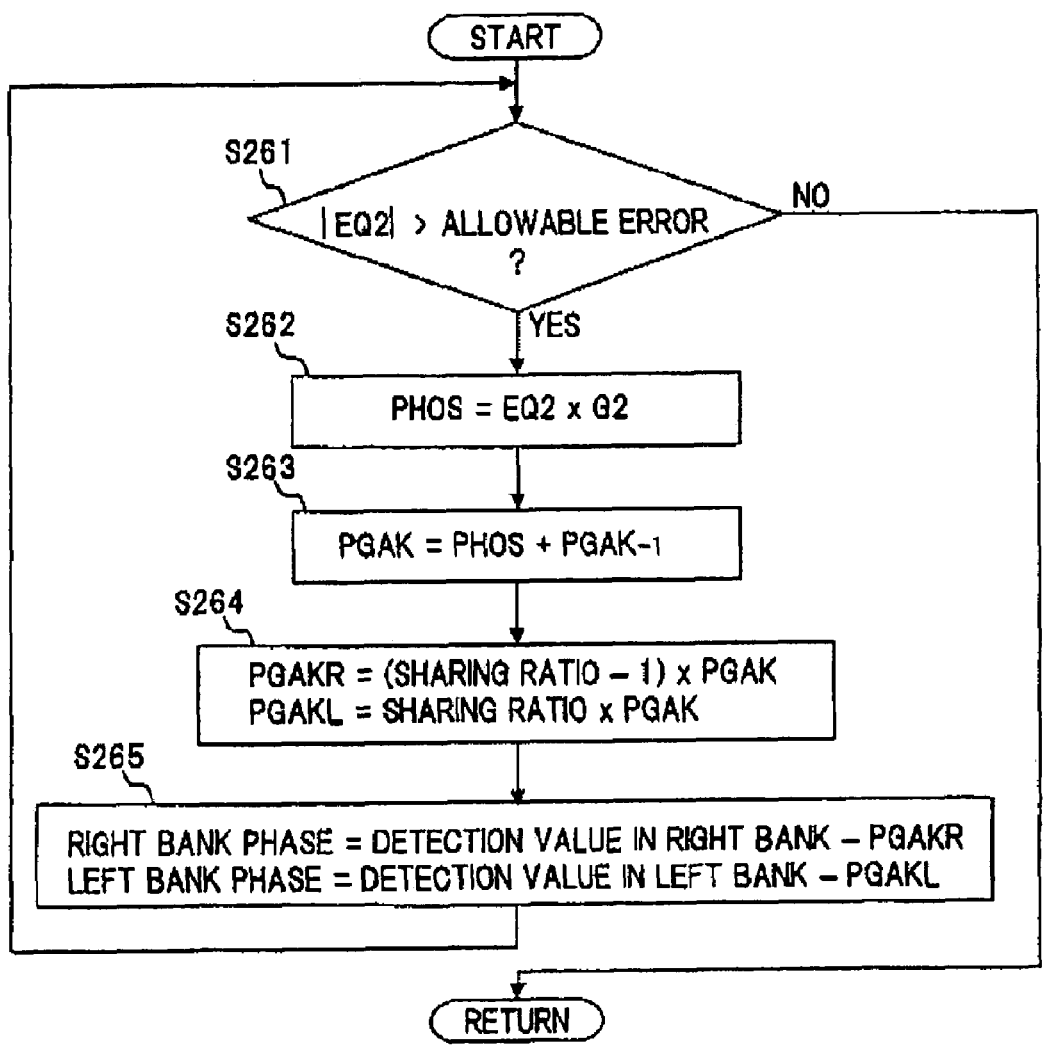
FIG. 16 is a flowchart showing correction value learning process, based on the intake air amount difference between the banks in the operating region B, according to the embodiment of the present invention.

The details of the process in step S25 is shown in a flowchart of FIG. 16.

In the flowchart of FIG. 16, in step S261, it is judged whether or not the absolute value of the error EQ2 (EQ2=BNKSTPMS or BNKSTPIC or BNKSTPAL) in intake air amount between the banks exceeds the allowable error, and if the error EQ2 exceeds the allowable error, the routine proceeds to step S262.

In step S262, the error EQ2 is multiplied with the conversion coefficient G2, to thereby calculate the correction value PHOS.

In next step S263, the correction value PHOS is added to the immediately previous value $PGAK_{-1}$ of the learning correction value PGAK and an addition result is stored as a new learning correction value PGAK.

In step S264, similarly to step S254, the learning correction value PGAK obtained in step S263 is separated into a learning correction value PGAKR for the right bank and a learning correction value PGAKL for the left bank.

To be specific, the learning correction value PGAKR for the right bank is calculated as "PGAKR=(sharing ratio−1)×PGAK", and the learning correction value PGAKL is calculated as "PGAKL=sharing ratio×PGAK".

In step S265, the detection results of phase of the center in the right bank and the left bank are corrected respectively with the learning correction values PGAKR and PGAKL, and the actuating variable for each center phase variable mechanism 113a, 113b is feedback controlled based on the phase of the center after correction.

Then, during the absolute value of the error EQ2 (EQ2=BNKSTPMS or BNKSTPIC or BNKSTPAL) exceeds the allowable error, the process in steps S262 to S265 is repetitively executed.

In step S24 in the flowchart of FIG. 11, if it is judged that ANV is smaller than the threshold SLB and the operating condition corresponds to the operating region C, the routine proceeds to step S26.

Then, the error EQ2 in intake air amount between the banks is served to each valve lift amount variable mechanism 112a, 112b and each center phase variable mechanism 113a, 113b, so that the correction values thereof are learned.

Figure 17:
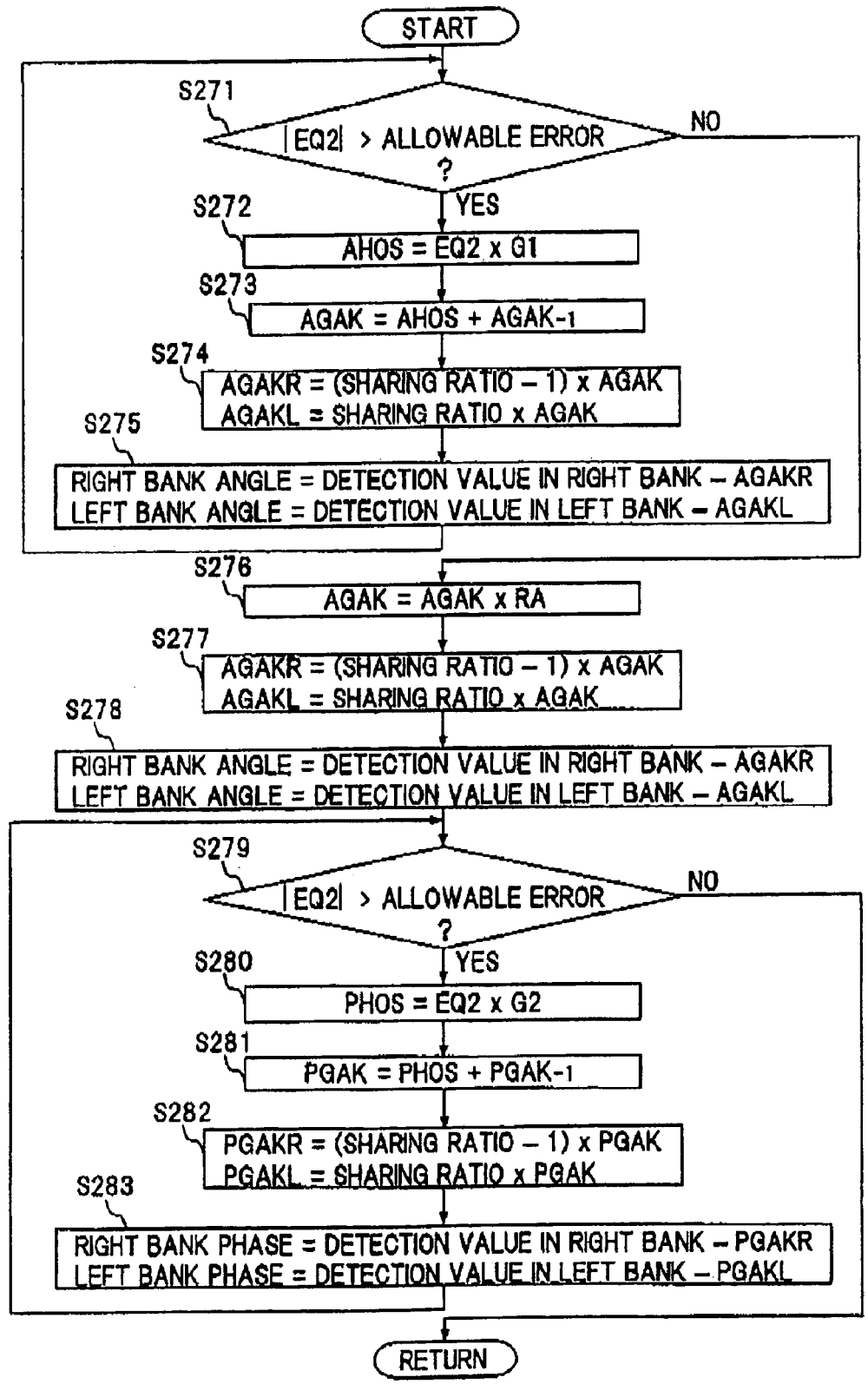
FIG. 17 is a flowchart showing correction value learning process, based on the intake air amount difference between the banks, according to the embodiment of the present invention.

The details of the learning operation in step S26 will be described in accordance with a flowchart of FIG. 17.

In step S271 through S275, similarly to steps S251 to 255 in the flowchart of FIG. 15, it is assumed that the error EQ2 at the time depends on only the deviation of the valve operating angle and the valve lift amount from the respective reference values, and the learning correction value AGAK is updated, and further, the learning correction value AGAK is separated into the learning correction value AGAKR allotted to the right bank and the learning correction value AGAKL allotted to the left bank, based on the sharing ratio, so that the actuating variable for each valve lift amount variable mechanism 112a, 112b is feedback controlled.

Then, if it is judged that the absolute value of the error EQ2 is equal to or less than the allowable error, the routine proceeds to step S276.

In step S276, the learning correction value AGAK updated in step S273 is multiplied with the influence ratio RA, to be converted into the learning correction value corresponding to the error component due to the deviation of the valve operating angle and the valve lift amount from the reference values, in the error EQ2.

In the learning in steps S271 through S275, it is assumed that the error EQ2 occurs due to only the deviation of the valve operating angle and the valve lift amount from the respective reference values, and the learning correction value AGAK is updated. However, in the operating region C, the error EQ2 occurs due to the influence by the valve operating angle and the valve lift amount, and also occurs due to the influence by the phase of the center.

Namely, the error EQ2 in the operating region C is a value obtained by adding the error influenced by the valve operating angle and the valve lift amount and the error influenced by the phase of the center.

Accordingly, if the learning result in step S273 is applied just as it is, there is a possibility that the error EQ2 becomes larger, for example when the phase of the center of intake valve 105 is changed.

Therefore, the influence ratio RA of the valve operating angle and the valve lift amount on the error EQ2 at the time is estimated, and the learning result in step S273 is corrected with the influence ratio RA, to thereby obtain the learning value corresponding to the error depending on only the deviation of the valve operating angle and the valve lift amount from the reference values.

$$AGAK=AGAK\times RA$$

Here, as described in the above, the influence ratio RA is calculated as RA=QA/QS (note, $1\geq FRA\geq 0$), based on the intake air amount QS for when it is assumed that the intake air amount is changed in proportion to the opening area of intake valve 105, and the intake air amount QA detected by air flow sensor 115 (refer to FIG. 10).

As shown in FIG. 10, the influence ratio RA is set at the value near 1 in the vicinity of the boundary to the operating region A, and is set to be smaller as the operating condition approach the operating region B. Such a tendency of the influence ratio RA corresponds to that the valve operating angle and the valve lift amount greatly influence on the error EQ2 as the operating conditions approach the operating region A, whereas the phase of the center greatly influences on the error EQ2 as the operating conditions approach the operating region B.

In step S277, the learning correction value AGAK corrected with the influence ratio RA is allotted to each of the banks based on the sharing ratio, similarly to step S274.

Then, in next step S278, the detection results by angle sensor 32 in the right and left banks are respectively corrected with the corresponding learning correction values AGAKR and AGAKL, and the actuating variable for each valve lift amount variable mechanism 112a, 112b are feedback controlled based on the angle detection values after correction.

By the above described feedback control, the error component influenced by the valve operating angle and the valve lift amount, in the error EQ2, is resolved, and the error EQ2 in this state is assumed to occur due to the deviation of the phase of the center from the reference value.

Therefore, in steps S279 to S283, similarly to steps S261 to S265 in the flowchart of FIG. 16, the learning correction value PGAK is updated, to thereby resolve the error in intake air amount between the banks, which depends on the deviation of the phase of the center from the reference value.

According to the above configuration, it is possible to resolve the error in intake air amount between the banks, which depends on each valve lift amount variable mechanism 112a or 112b and each center phase variable mechanism 113a, or 113b, so as to improve the engine operability.

Further, even in the region where the error in intake air amount between the banks is influenced by both of each valve lift amount variable mechanism 112a, or 112b and each center phase variable mechanism 113a, or 113b, it is possible to perform the learning with high precision, and therefore, learning opportunities can be sufficiently obtained to thereby promptly realize the error resolution.

Incidentally, in the above embodiment, when the learning is performed on the error in intake air amount depending on each valve lift amount variable mechanism 112a, 112b and each center phase variable mechanism 113a, 113b, in order to resolve such an error, each valve lift amount variable mechanism 112a, 112b and each center phase variable mechanism 113a, 113b are correctively controlled. However, it is also possible to correct the torque difference due to the error in intake air amount by correcting ignition timing.

Further, as the correction for resolving the error in intake air amount, in the above embodiment, the detection values of the actuating variables for each valve lift amount variable mechanism 112a, 112b and each center phase variable mechanism 113a, 113b are corrected. However, it is also possible to correct the target value or the actuating variables.

The entire contents of Japanese Patent Application No. 2006-344818 filed on Dec. 21, 2006, a priority of which is claimed, are incorporated herein by reference.

While only a selected embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined by the appended claims and their equivalents.

We claim:

1. A control apparatus for a variable valve apparatus including a center phase variable mechanism which varies a phase of the center of an operating angle of an intake valve, and a valve lift amount variable mechanism which varies a valve lift amount of the intake valve and the operating angle thereof, comprising:

a region discriminating section that discriminates an operating region of an engine as to which one of a first operating region where an intake air amount changes in proportion to an opening area of the intake valve, a second operating region where the intake air amount does not substantially change relative to a change in the opening area of the intake valve, and an intermediate operating region between the first and second operating regions does take place;

an error computing section that computes an error in intake air amount of the engine;

an influence ratio computing section that, when the engine is operated in the intermediate operating region, computes influence ratio between influence on the center phase variable mechanism and that on the valve lift amount variable mechanism in relation to the error in intake air amount computed by the error computing section; and a learning section that, when the engine is operated in the intermediate operating region, learns correction values for correcting control process of the center phase variable mechanism and control process of the valve lift amount variable mechanism, based on the error in intake air amount computed by the error computing section and the influence ratio computed by the influence ratio computing section.

2. The control apparatus according to claim 1, wherein the learning section comprises:

a first learning section that learns a phase correction value for correcting a control process of the center phase variable mechanism, based on the error in intake air amount computed by the error computing section and an occupied rate of the center phase variable mechanism in the influence ratio computed by the influence ratio computing section; and a second learning section that learns a valve lift amount correction value for correcting a control process of the valve lift amount variable mechanism, based on the error in intake air amount computed by the error computing section, in a state where the control process of the center phase variable mechanism is corrected with the phase correction value.

3. The control apparatus according to claim 1, wherein the learning section comprises:
a third learning section that learns a valve lift amount correction value for correcting a control process of the valve lift amount variable mechanism, based on the error in intake air amount computed by the error computing section and occupied rate of the valve lift amount variable mechanism in the influence ratio computed by the influence ratio computing section; and
a fourth learning section that learns a phase correction value for correcting a control process of the center phase variable mechanism, based on the error in intake air amount computed by the error computing section, in a state where the control process of the valve lift amount variable mechanism is corrected with the valve lift amount correction value.

4. The control apparatus according to claim 1, wherein the error computing section computes a difference between an actual intake air amount and an intake air amount estimated based on an engine operating condition, as the error in intake air amount.

5. The control apparatus according to claim 1, wherein the engine is provided with a plurality of banks each being provided with the center phase variable mechanism and the valve lift amount variable mechanism, and
the error computing section computes a difference of intake air amount between the plurality of banks, as the error in intake air amount.

6. The control apparatus according to claim 1, further comprising;
a valve lift amount learning section that, when the engine is operated in the first operating region where the intake air amount changes in proportion to the opening area of the intake valve, learns a valve lift amount correction value for correcting the control process of the valve lift amount variable mechanism, based on the error in intake air amount computed by the error computing section.

7. The control apparatus according to claim 1, further comprising;
a phase learning section that, when the engine is operated in the second operating region where the intake air amount does not substantially change relative to the change in the opening area of the intake valve, learns a phase correction value for correcting a control process of the center phase variable mechanism, based on the error in intake air amount computed by the error computing section.

8. The control apparatus according to claim 1, wherein the region discriminating section discriminates the engine operating region, based on the opening area of the intake valve.

9. The control apparatus according to claim 1, wherein the influence ratio computing section computes the influence ratio between the center phase variable mechanism and the valve lift amount variable mechanism in relation to the error in intake air amount computed by the error computing section, based on the intake air amount computed on the assumption that the intake air amount of the engine is changed in proportion to the opening area of the intake valve and an actual intake air amount at the time.

10. The control apparatus according to claim 1, wherein in the intermediate operating region, the influence ratio computing section sets occupied rate of the valve lift amount variable mechanism in the influence ratio to become larger as the operating conditions are near the first operating region where the intake air amount changes in proportion to the opening area of the intake valve, and sets occupied rate of the center phase variable mechanism in the influence ratio to become larger as the operating conditions are near the second operating region where the intake air amount does not substantially change relative to the change in the opening area of the intake valve.

11. A control apparatus for a variable valve apparatus including a center phase variable mechanism which varies a phase of the center of an operating angle of an intake valve, and a valve lift amount variable mechanism which varies a valve lift amount of the intake valve and the operating angle thereof, comprising:
region discriminating means for discriminating operating regions of an engine as to which one of a first operating region where an intake air amount changes in proportion to an opening area of the intake valve, a second operating region where the intake air amount does not substantially change relative to a change in the opening area of the intake valve, and an intermediate operating region between the first and second operating regions does take place;
error computing means for computing an error in intake air amount of the engine;
influence ratio computing means for, when the engine is operated in the intermediate operating region, computing influence ratio between influence on the center phase variable mechanism and that on the valve lift amount variable mechanism in relation to the error in intake air amount computed by the error computing means; and
learning means for, when the engine is operated in the intermediate operating region, learning correction values for correcting control process of the center phase variable mechanism and control process of the valve lift amount variable mechanism, based on the error in intake air amount computed by the error computing means and the influence ratio computed by the influence ratio computing means.

12. A control method for a variable valve apparatus including a center phase variable mechanism which varies a phase of the center of an operating angle of an intake valve, and a valve lift amount variable mechanism which varies a valve lift amount of the intake valve and the operating angle thereof, comprising the steps of:
discriminating operating regions of an engine as to which one of a first operating region where an intake air amount changes in proportion to an opening area of the intake valve, a second operating region where the intake air amount does not substantially change relative to a change in the opening area of the intake valve, and an intermediate operating region between the first and second operating regions does take place;
computing an error in intake air amount of the engine;
computing influence ratio between influence on the center phase variable mechanism and that on the valve lift amount variable mechanism in relation to the error in intake air amount, when the engine is operated in the intermediate operating region; and
when the engine is operated in the intermediate operating region, learning correction values for correcting control process of the center phase variable mechanism and control process of the valve lift amount variable mechanism, based on the error in intake air amount and the influence ratio computed in the steps of computing, respectively.

13. The control method according to claim 12, wherein the step of learning the correction values comprises the steps of:

learning a phase correction value for correcting a control process of the center phase variable mechanism, based on the error in intake air amount and occupied rate of the center phase variable mechanism in the influence ratio; and learning a valve lift amount correction value for correcting a control process of the valve lift amount variable mechanism, based on the error in intake air amount, in a state where the control process of the center phase variable mechanism is corrected with the phase correction value.

14. The control method according to claim 12, wherein the step of learning the correction values comprises the steps of:

learning a valve lift amount correction value for correcting a control process of the valve lift amount variable mechanism, based on the error in intake air amount and occupied rate of the valve lift amount variable mechanism in the influence ratio; and learning a phase correction value for correcting a control process of the center phase variable mechanism, based on the error in intake air amount, in a state where the control process of the valve lift amount variable mechanism is corrected with the valve lift amount correction value.

15. The control method according to claim 12, wherein the step of computing the error in intake air amount comprises the steps of:

estimating the intake air amount based on engine operating condition;

measuring the intake air amount of the engine; and computing a difference between the estimated value of the intake air amount and the measurement value of the intake air amount, as the error in intake air amount.

16. The control method according to claim 12, wherein the engine is provided with a plurality of banks each being provided with the center phase variable mechanism and the valve lift amount variable mechanism, and the step of computing the error in intake air amount comprises the step of;

computing a difference of the intake air amount between the plurality of banks, as the error in intake air amount.

17. The control method according to claim 12, further comprising the step of;

when the engine is operated in the first operating region where the intake air amount changes in proportion to the opening area of the intake valve, learning a valve lift amount correction value for correcting a control process of the valve lift amount variable mechanism, based on the error in intake air amount.

18. The control method according to claim 12, further comprising the step of;

when the engine is operated in the second operating region where the intake air amount does not substantially change relative to the change in the opening area of the intake valve, learning a phase correction value for correcting a control process of the center phase variable mechanism, based on the error in intake air amount.

19. The control method according to claim 12, wherein the step of discriminating the operating regions comprises the steps of:

computing the opening area of the intake valve;

comparing the opening area of the intake valve with a threshold; and discriminating the engine operating regions, based on the comparison result.

20. The control method according to claim 12, wherein the step of computing the influence ratio comprises the steps of:

estimating the intake air amount on the assumption that the intake air amount of the engine is changed in proportion to the opening area of the intake valve; and computing the influence ratio between the center phase variable mechanism and the valve lift amount variable mechanism in relation to the error in intake air amount, based on the estimated value of the intake air amount and an actual intake amount at the time.

21. The control method according to claim 12, wherein the step of computing the influence ratio comprises the steps of:

in the intermediate operating region, discriminating whether the operating conditions are near the first operating region where the intake air amount changes in proportion to the opening are of the intake valve or the second operating region where the intake air amount does not substantially change relative to the change in the opening area of the intake valve; and in the intermediate operating region, setting occupied rate of the valve lift amount variable mechanism in the influence ratio to become larger as the operating conditions are near the first operating region where the intake air amount changes in proportion to the opening area of the intake valve, and setting occupied rate of the center phase variable mechanism in the influence ratio to become larger as the operating conditions are near the second operating region where the intake air amount does not substantially change relative to the change in the opening area of the intake valve.

\* \* \* \* \*